United States Patent
Samuelson et al.

(10) Patent No.: US 10,657,834 B2
(45) Date of Patent: May 19, 2020

(54) SMART BOOKMARKS

(71) Applicant: COURSERA, INC., Mountain View, CA (US)

(72) Inventors: Jacob K. Samuelson, Weston, MA (US); Mustafa Furniturewala, Sunnyvale, CA (US); Donald Geoffrey Schuller, San Jose, CA (US); Brice Benjamin Pollock, Jordan, MN (US)

(73) Assignee: COURSERA, INC., Mountain View, CA (US)

( * ) Notice: Subject to any disclaimer, the term of this patent is extended or adjusted under 35 U.S.C. 154(b) by 301 days.

(21) Appl. No.: 15/877,093

(22) Filed: Jan. 22, 2018

(65) Prior Publication Data

US 2018/0211552 A1    Jul. 26, 2018

Related U.S. Application Data

(60) Provisional application No. 62/448,945, filed on Jan. 20, 2017.

(51) Int. Cl.
| | |
|---|---|
| *G09B 5/06* | (2006.01) |
| *H04N 21/472* | (2011.01) |
| *G06Q 50/20* | (2012.01) |
| *G06F 16/738* | (2019.01) |
| *G06F 16/783* | (2019.01) |
| *H04N 21/81* | (2011.01) |
| *G06F 40/169* | (2020.01) |

(52) U.S. Cl.
CPC ............ *G09B 5/06* (2013.01); *G06F 16/739* (2019.01); *G06F 16/7844* (2019.01); *G06F 40/169* (2020.01); *G06Q 50/20* (2013.01); *H04N 21/47217* (2013.01); *H04N 21/8133* (2013.01)

(58) Field of Classification Search
USPC ........ 434/308, 309, 322, 323; 709/217, 219; 715/203, 206
See application file for complete search history.

(56) References Cited

U.S. PATENT DOCUMENTS

| | | | | |
|---|---|---|---|---|
| 6,064,380 A | * | 5/2000 | Swenson | ................. G06F 16/40 715/273 |
| 8,166,384 B1 | * | 4/2012 | Kaplan | ............... G06F 16/9562 715/206 |
| 2007/0027949 A1 | * | 2/2007 | Park | ..................... G11B 27/034 709/203 |

(Continued)

*Primary Examiner* — Kurt Fernstrom
(74) *Attorney, Agent, or Firm* — Brake Hughes Bellermann LLP

(57) ABSTRACT

In one general aspect, a method for generating a note for a video of an online course can include providing a video of an online course for display in a user interface on a display device included in a computing device, providing a transcript of the video of the online course synchronously with the providing of the video of the online course, the transcript being displayed in the user interface with the video of the online course, receiving an indication of a selection of a save-a-note element included in the user interface, and in response to receiving the indication of the save-a-note element, creating a note for the video of the online course. The note can include an indicator of a frame in the video when a particular phrase included in the transcript of the video is spoken, the particular phrase, and a screen shot of the frame.

20 Claims, 17 Drawing Sheets

(56) References Cited

U.S. PATENT DOCUMENTS

| | | | | |
|---|---|---|---|---|
| 2008/0286739 A1* | 11/2008 | Umrigar | ............... | G09B 7/02 |
| | | | | 434/323 |
| 2010/0088726 A1* | 4/2010 | Curtis | ............... | G11B 27/034 |
| | | | | 725/45 |
| 2012/0030554 A1* | 2/2012 | Toya | ............... | H04N 7/17318 |
| | | | | 715/206 |
| 2013/0031208 A1* | 1/2013 | Linton | ............... | G09B 7/02 |
| | | | | 709/217 |
| 2013/0282877 A1* | 10/2013 | Keum | ............... | H04L 65/601 |
| | | | | 709/219 |
| 2015/0037006 A1* | 2/2015 | Tapper | ............... | G11B 27/10 |
| | | | | 386/241 |
| 2015/0100993 A1* | 4/2015 | Lee | ............... | H04N 5/765 |
| | | | | 725/90 |
| 2017/0351651 A1* | 12/2017 | Kaur | ............... | G06F 40/169 |
| 2018/0047429 A1* | 2/2018 | Smith | ............... | H04N 21/8586 |
| 2018/0137125 A1* | 5/2018 | Vittorio | ............... | G06Q 50/10 |

\* cited by examiner

SMART BOOKMARKS

CROSS-REFERENCE TO RELATED APPLICATIONS

This application claims priority under 35 U.S.C. § 119(e)(1), to U.S. Provisional Application Ser. No. 62/448,945, filed on Jan. 20, 2017, the entire contents of which are incorporated herein.

TECHNICAL FIELD

This description generally relates to the taking of notes by a learner for an online course lecture.

BACKGROUND

A user on a computing device can navigate to a website or an application that can provide a selection of online courses (online lectures) on a variety of subjects. The online courses can be videos that a user can watch on a display device included in the computing device. While watching the online course, a user may want to take notes that relate to the online course content. The learner may then access the notes at a later time when, for example, the learner may need to review the content in preparation for a quiz or test.

SUMMARY

According to one general aspect, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method for generating a note for a video of an online course can include providing, by a computer system and to a computing device, a video of an online course for display in a user interface on a display device included in the computing device, providing, by the computer system and to the computing device, a transcript of the video of the online course synchronously with the providing of the video of the online course, the transcript being displayed in the user interface with the video of the online course, receiving, by the computer system and from the computing device, an indication of a selection of a save-a-note element included in the user interface, and in response to receiving the indication of the save-a-note element, creating a note for the video of the online course. The note can include an indicator of a frame in the video when a particular phrase included in the transcript of the video is spoken, the particular phrase, and a screen shot of the frame.

Implementations can include one or more of the following features, alone or in combination with one or more other features. For example, the transcript can include a plurality of phrases. The plurality of phrases can include at least one phrase that was spoken before the particular phrase and at least one phrase that was spoken after the particular phase. Creating the note can further include receiving, by the computer system and from the computing device, a learner annotation for inclusion in the note. The method can further include storing, by the computer system, the note in a notes repository. The method can further include determining an amount of text included in the transcript of the video for including in the note. Determining an amount of text included in the transcript of the video for including in the note can include identifying the particular phrase in the transcript, and identifying at least one sentence that includes the particular phrase. Determining the amount of text included in the transcript of the video for including in the note can further include identifying additional phrases included in the at least one sentence. Determining the amount of text included in the transcript of the video for including in the note can further include identifying a concept that includes the particular phrase and the identified additional phrases. The note can further include the concept.

In another general aspect, a method for reviewing notes for a video of an online course can include receiving, by a computer system and from a computing device, an indication of a selection of a notes element included in a user interface displayed on a display device of the computing device. In response to receiving the indication of the selection of the notes element, the method can further include accessing, by the computer system, a database that includes notes for an online course, the notes being previously created by a learner for the online course, and providing, by the computer system and to the computing device, at least one note summary for a note for the online course that is included in the database, the at least one note summary being for display in the user interface. The method can further include receiving, by the computer system and from the computing device, an indication of a selection of the at least one note summary. In response to receiving the indication of the selection of the at least one note summary, the method can further include retrieving, by the computer system, the note for the online course from the database, and providing, by the computer system and to the computing device, the note for display on the display device of the computing device, the note including an indicator of a frame in a video of an online course when a particular phrase included in a transcript of the video is spoken, a transcript of at least the particular phrase, and a screen shot of the frame.

Implementations can include one or more of the following features, alone or in combination with one or more other features. For example, the note can further include a learner annotation. The computing device can be in a portrait mode of operation. The transcript of at least the particular phrase can include a concept that includes the particular phrase.

In yet another general aspect, a computer system can include an online course repository including a plurality of videos and transcripts of online courses, a notes repository, and a server including a course application, a note creator application, and a note retrieving application. The course application can be configured to retrieve a video of an online course from the plurality of videos of online courses included in the online course repository, retrieve a transcript of the video of the online course from the online course repository, and provide the video of the online course synchronously with the transcript of the video of the online course, the video and the transcript for display in a user interface on a display device included in a computing device. The note creator application can be configured to create a note for the video for the online course, the note including an indicator of a frame in the video when a particular phrase included in the transcript of the video is spoken, the particular phrase, and a screen shot of the frame, and store the note in the notes repository. The note retrieving application can be configured to provide a note summary for the note stored in the notes repository, retrieve the note from the notes repository, and provide the note to a computing device for display in a user interface on a display device included in the computing device.

Implementations can include one or more of the following features, alone or in combination with one or more other features. For example, creating the note can further include a learner annotation. Creating the note can further include determining an amount of text included in the transcript of the video of the online course for including in the note. Determining an amount of text included in the transcript of the video of the online course for including in the note can include identifying the particular phrase in the transcript, identifying a concept that includes the particular phrase. The note can further include the concept. Identifying a concept that includes the particular phrase can include identifying at least one sentence that includes the particular phrase, identifying additional phrases included in the at least one sentence, and identifying additional sentences for the concept, the additional sentences being adjacent to the at least one sentence in the transcript of the video. The concept can include the at least one sentence and the additional sentences. The transcript can include a plurality of phrases. The plurality of phrases can include at least one phrase that was spoken before the particular phrase and at least one phrase that was spoken after the particular phase. The plurality of phrases can be included in at least one sentence. The at least one sentence can be included in the transcript of the video.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
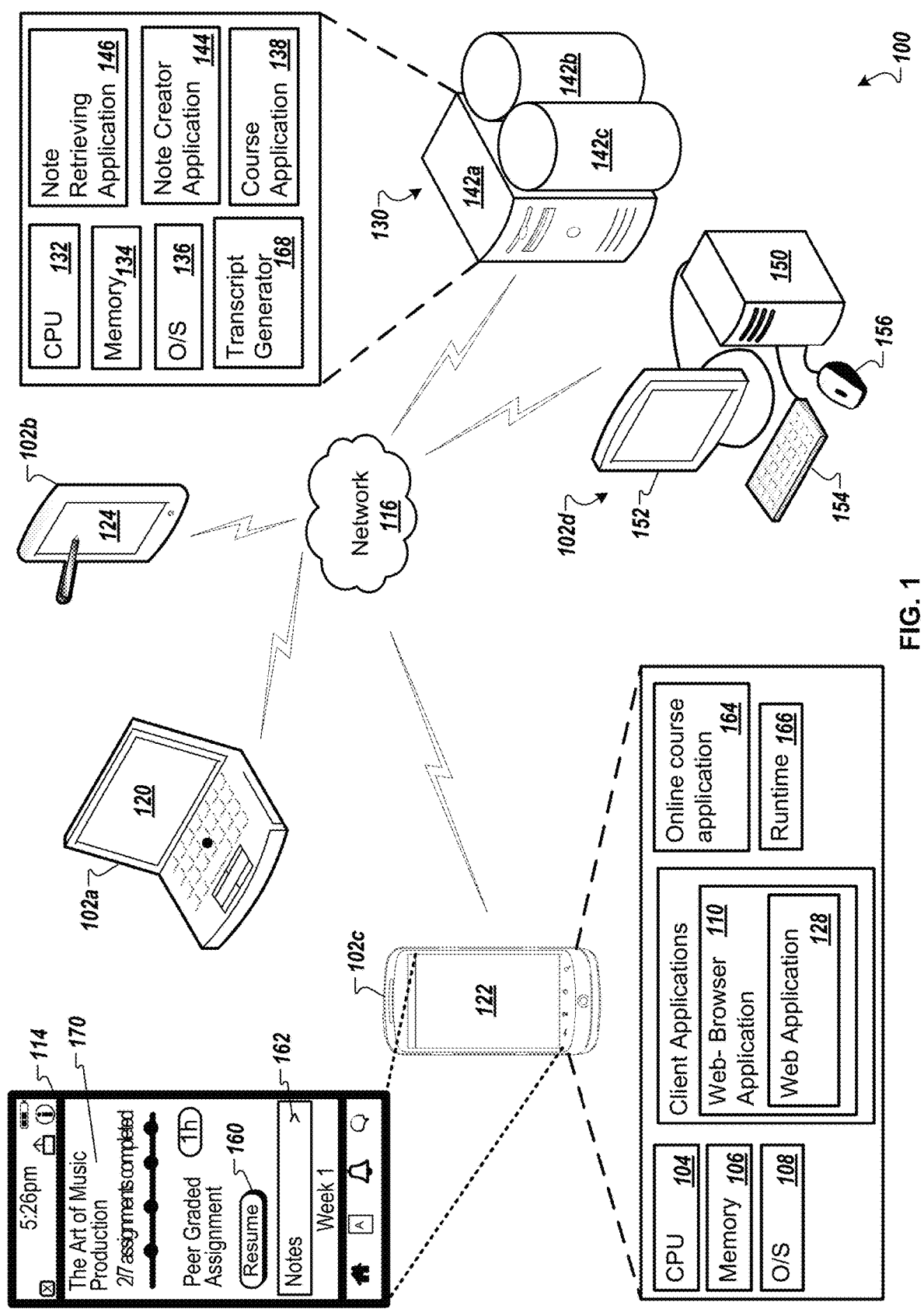
FIG. 1 is a diagram of an example system that can be used to provide a video of an online course and to create a note.

A user on a computing device can access and use a service that provides a selection of courses on a variety of subjects. The courses can be available online and distributed to users by way of the internet. The courses can include many different types of content such as media content that can include video lectures that include visual and audio content, slideshows that can include visual and audio content, and audio lectures. A user can watch and/or listen to the content on the computing device. The video lecture, the slideshow, and the audio lecture can each be associated with a synchronized text-transcript of the presented verbal (audio) content. While watching and listening to the video lecture or the transcripted slideshow, or while listening to the audio lecture, a user may want to capture important content and add additional information about the content as a way to take notes on the content. The user may then access the notes at a later time when, for example, the user may need to review the content in preparation for a quiz or test.

A user can watch or listen to media content that has a synchronized transcript and, when they see or hear something that they believe is important, they user can save it as a note. Doing so can intelligently capture the correct part of the transcript so the note contains the concept that was being taught. A user can also add their own thoughts to the captured note by annotating the note.

For example, a learner can enroll in a course that can be offered by an online course provider. The learner can use one or more computing devices to access content for the online course from a computer system by way of a network. In a non-limiting example, the computing device can be a laptop computer, a desktop computer, a smartphone, a personal digital assistant, a tablet computer, a smartwatch, or a notebook computer. In some cases, the learner can access and participate in the online course using a web browser running on the computing device and connecting to a web site for the online course by way of a network. In some cases, the learner can install a native application on the computing device and can access the online course by running (executing) the native application. In some cases, using the native application, the learner can obtain one or more sections of the online course for viewing (or listening to) offline (without the need for a network connection and without accessing the computer system).

The online course can include one or more online lectures, classes, or sections that may be offered at various times during the offering of the online course. For example, some sections of the online course can be offered as a video that includes visual and audio content. The user can watch the video content on a display device included in the computing device. The user can listen to the audio content on one or more speakers that are included in the computing device. The display device can display the videos of the online course in a user interface that can include additional controls (e.g., buttons). A learner can interact with the controls in order to bookmark one or more parts of the online course.

The provider of the online course can provide the videos of the online course and a transcript of the online course. The transcript can include the text of the audio content (e.g., the text of the words spoken by a lecturer when giving the online course). The transcript can be synchronized with the video of the online course and can be synchronously presented with the playing of the video of the online course. The video and the transcript can be included in a user interface for display on a display device included in a computing device of a learner.

A learner may want to take notes while participating in the online course. In some cases, a learner may take a screen capture of parts of the video of the online course. In addition or the alternative, a learner may take notes about the online course in a word processing application, a notes application, or by hand in a physical notebook. This can be a laborious way to take notes for the online course and takes the learner outside of the online course environment.

In some implementations, the provider of an online course platform may also provide the ability for a learner to take notes while actively participating in the online course. For example, while participating in the online course (e.g., watching each section of the online course) a learner can interact with one or more controls provided in a user interface that displays (plays) the video of the online course. For example, a learner can click on (select) a control (e.g., a button) included in the user interface. The interaction with the one or more controls can allow the learner to add or create a note that is based on a particular part of the online course that the learner has identified as included content that is important to the learner.

The note can be considered a smart bookmark The smart bookmark can include information about a concept (e.g., parts of the text-transcript for the concept) that was being discussed at the point of the selection of the control, a screenshot from the part of the video that was playing when the control was selected, and any notes or annotations added by the learner when the note was created. Learners can save notes themselves, as they view or listen to course materials.

In some implementations, a note can be a smart bookmark created or suggested by other learners for the online course that may have created other smart bookmarks for the online course. One or more of these smart bookmarks can be suggested to or provided to a particular learner based on, for example, one or more algorithms that can determine a relevancy of the bookmark to the particular learner in the context of the online course or interactions of the particular learner with the online course.

The particular part of the online course is determined based on when the learner clicks on (selects) the control. For example, the particular part of the online course will be the part of the video of the online course that is being displayed (that is playing) when the learner clicks on (selects) the control. The particular part of the video of the online course will have an associated time based on a total playing time of the video. For example, a learner can click on (select) the control two minutes and seven seconds into the playing of a twenty minute video. Once the learner selects the control (e.g., clicks on the button), the learner can add a note that will be correlated with (associated with) the video of the online course at the point in time (e.g., two minutes, seven seconds) when the control was selected by the learner. For example, at time of the selection of the control a screenshot of the video of the online course is grabbed (captured and saved), one or more transcript sentences can be identified to include with captured and saved screenshot, and, in some cases, the learner can add comments to save along with the captured screenshot as a note.

Because the transcript of the online course is synchronized with the video of the online course, one or more lines or sentences of the transcript can be included in the note created by the learner. A note, therefore, can include parts of the transcript that are correlated with (synchronized with) the point in time in the video of the online course selected by the learner for creating the note. In addition, the note can include information entered into the note by the learner. This additional information can be referred to as a learner annotation to a note. For example, the learner can add comments or additional thoughts of the learner to the notelearner annotation.

A learner can create a plurality of notes, each note being created for and correlated with a different part of the online course. Each note can be stored for the learner in a repository. The learner at a point later in time can refer back to the stored notes. The learner can interact with each note that includes the point in time in the video selected by the learner as well as a part of the transcript (e.g., one or more lines or sentences) correlated with (synchronized with) the selected point in time in the video. The point in time is established as the beginning of the presentation of the concept considered interesting and/or important to the learner. For example, the learner can access and view the video at the selected point in time along with the associated transcript. In some example, the learner may only review the transcript. The learner can also review any notes or annotations included by the learner in the note when the note was created. In some implementations, in cases where a note is a summary or aggregate of notes created by multiple learners for the online course, a learner can interact with and review the aggregate or summary of the notes.

A learner can simply click or select a button or control in a user interface to initiate the creation of a note. The ability for a learner to create a note for a particular part of an online course that not only can include a point in time in the video of the online course but one or more lines (sentences) of the associated transcript that capture the concept presented at the point in time, a screenshot of a video that was playing when the creation of the note was initiated, and any additional information or annotations the learner wishes to include in the note with just a simple click (or selection) of a button in a user interface allows for an efficient taking of notes for an online course. In some implementations, a note can also include additional information that includes, but is not limited to, location information (e.g., Global Positioning System (GPS) coordinates), date and/or time information (e.g., real time clock (RTC) information, calendar entry information), a learner identification (ID), an item ID, an online course ID, and metadata for the online course.

In some implementations, a point in time for the video of the online course can be identified and analyzed within a context of associated synchronized text-transcript content. For example, if the learner clicks on (selects) a control (e.g., a button) in mid-sentence of a lecture for an online course, the created and stored note can be adjusted to include the point in time in the video that correlates to the start of the sentence, or concept being explained, as included in the transcript. In some implementations, one or more lines or sentences around the selected point in time in the video may be stored in the note. As such, the point in time in the video stored in the note can be adjusted to the start of the first sentence or line stored in the note. Creating a note that includes additional information around the selected point in time in the video can benefit a learner by providing more context for the note.

In some implementations, a learner can review any stored notes while viewing the video of the online course. In some implementations, the learner can review all stored notes for the learner on an individual note-by-note basis. For example, a learner may want to review the stored notes of the user before taking a quiz or exam for the online course. In some implementations, the online course platform can present the stored notes or present an option or reminder for the learner to access the stored notes at a particular course milestone or other identified important time for the online course (e.g., before a scheduled test or quiz).

FIG. 1 is a diagram of an example system 100 that can be used to provide a video of an online course and to create a note. The example system 100 includes a plurality of computing devices 102a-d (e.g., a laptop or notebook computer, a tablet computer, a smartphone, and a desktop computer, respectively). An example computing device 102c (e.g., a smartphone) can include one or more processors (e.g., a client central processing unit (CPU) 104) and one or more memory devices (e.g., a client memory 106). The computing device 102c can execute a client operating system (O/S) 108 and one or more client applications, such as a web browser application 110. The web browser application 110 can display a user interface (UI) on a display device 122 included in the computing device 102c.

A web application 128 may be configured to be executed or interpreted by a web browser application 110. The computing device 102c can download and install the natively operating applications from a server (e.g., server 142a) the using the web browser application 110. For example, the computing device 102c can download and install an online course application 164 provided by a computer system 130 that includes the server 142a by way of the network 116 using the web browser application 110. The online course application 164 may operate using a runtime 166. The online course application 164 may be configured to be executed directly by the client CPU 104 or by the client O/S 108, using the runtime 166.

The computer system 130 can include one or more computing devices (e.g., the server 142a) and one or more computer-readable storage devices (e.g., a database 142b and a database 142c). The server 142a can include one or more processors (e.g., a server CPU 132), and one or more memory devices (e.g., a server memory 134). The computing devices 102a-d can communicate with the computer system 130 (and the computer system 130 can communicate with the computing devices 102a-d) using a network 116. The server 142a can execute a server O/S 136. The server 142a can provide online course videos that can be included in (stored in) the database 142b, where the database 142b can be considered an online course repository. The server 142a can execute a course application 138 that can provide a video of an online course to the computing devices 102a-d using the network 116. The database 142c can serve as a repository for storing, for a learner, one or more notes for an online course. Each of the computing devices 102a-d can interface with the computer system 130 in order to gain access to and display the one or more notes stored in the database 142c independent of the computing device that provided the note for storage in the database 142c.

In some implementations, the computing devices 102a-d can be laptop or desktop computers, smartphones, personal digital assistants, tablet computers, or other appropriate computing devices that can communicate, using the network 116, with other computing devices or computer systems. In some implementations, the computing devices 102a-d can perform client-side operations, as discussed in further detail herein. Implementations and functions of the system 100 described herein with reference to computing device 102c, may also be applied to computing device 102b, computing device 102a, and computing device 102d and other computing devices not shown in FIG. 1 that may also be included in the system 100.

The computing device 102c includes the display device 122. In some implementations, the display device 122 can be a touchscreen. A learner can interact with the touchscreen to select one or more controls (e.g., a button 160, a forward control icon 162) displayed in a user interface (UI) 114.

The computing device 102b includes a display device 124. The computing device 102a includes a display device 120. A learner can interact with one or more input devices included in the computing device 102a (e.g., a keyboard, a pointer, a touchpad or trackpad) in order to select one or more controls that can be displayed in a user interface on the display device 120. In some implementations, the display device 120 can be a touchscreen. The learner can interact with the touchscreen included in the computing device 102a in a similar manner to interacting with the touchscreen that can be included in the computing device 102c. A UI may be displayed in a landscape mode on the display device 120. For example, a UI may be displayed in a portrait mode on the display device 122. For example, a user interface for the online course application 164 displayed in a landscape mode may differ from a user interface for the online course application 164 when displayed in a portrait mode. Both user interfaces, however, can provide the same functionality to the learner providing the learner the ability to save a note.

Figure 4A:
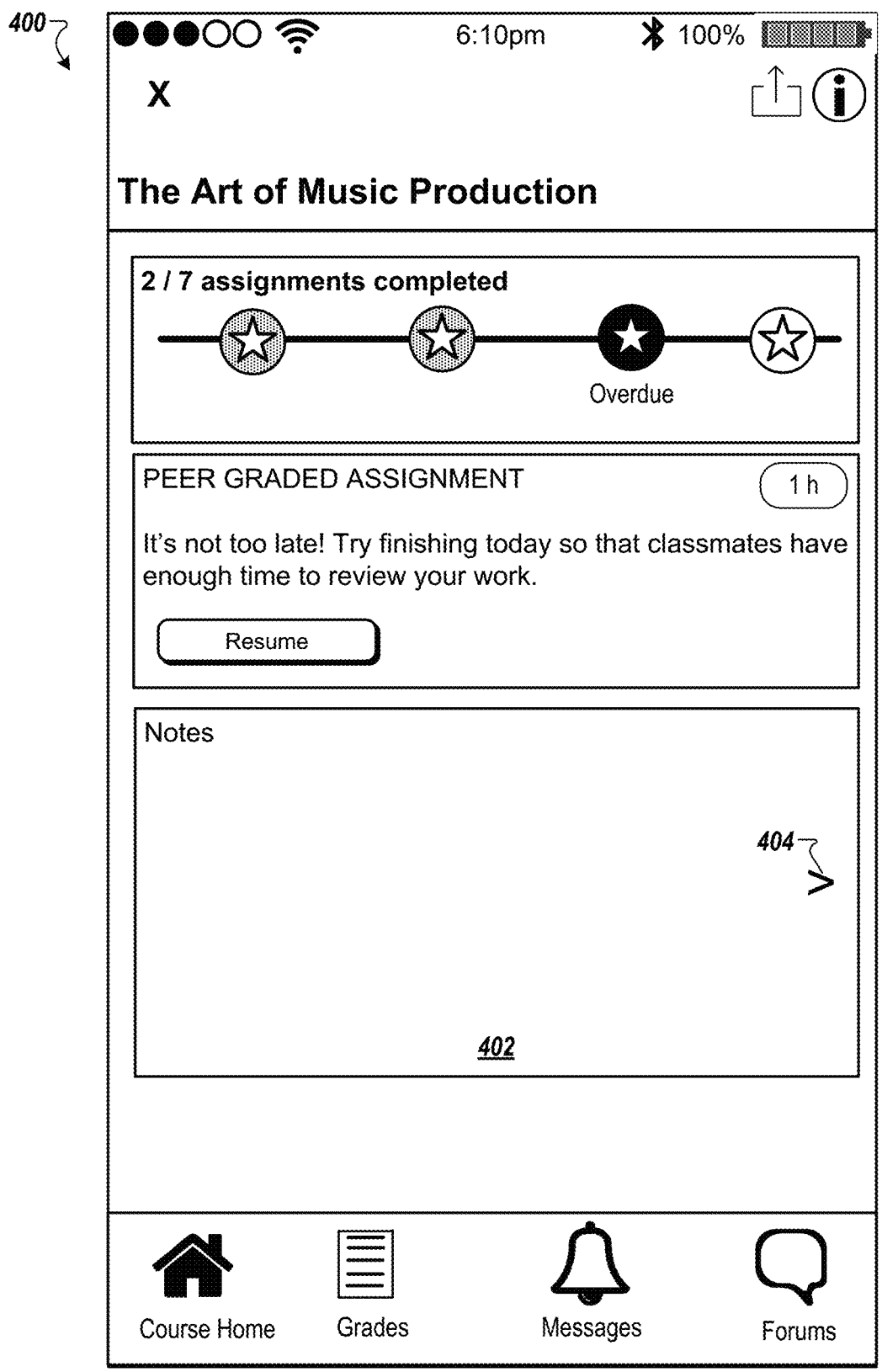
FIG. 4A shows an example screen shot of a user interface for an online course.
Figure 4B:
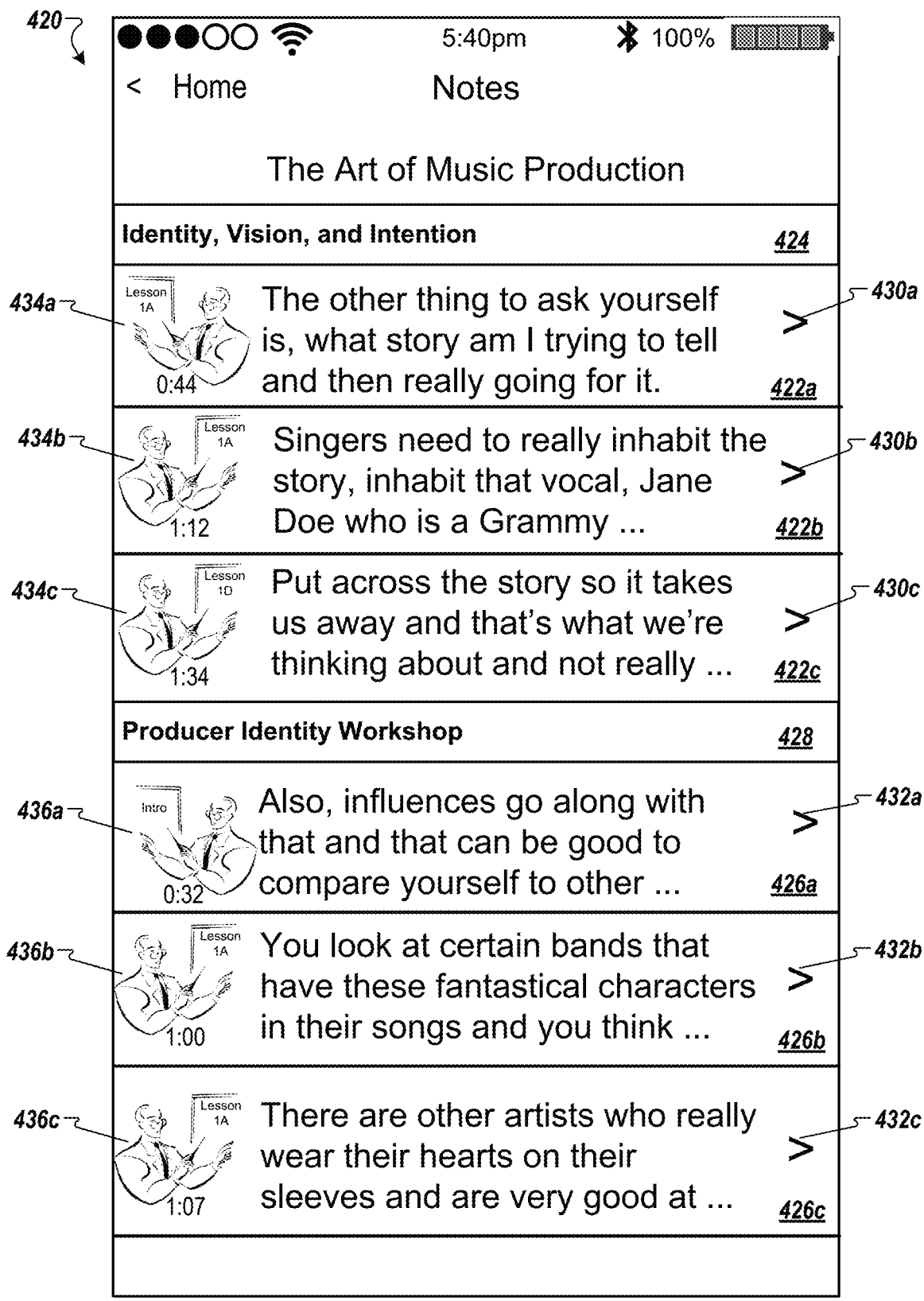
FIG. 4B shows an example screen shot of a user interface that includes note summaries for a first section for an online course and note summaries for a second section for an online course.
Figure 4C:
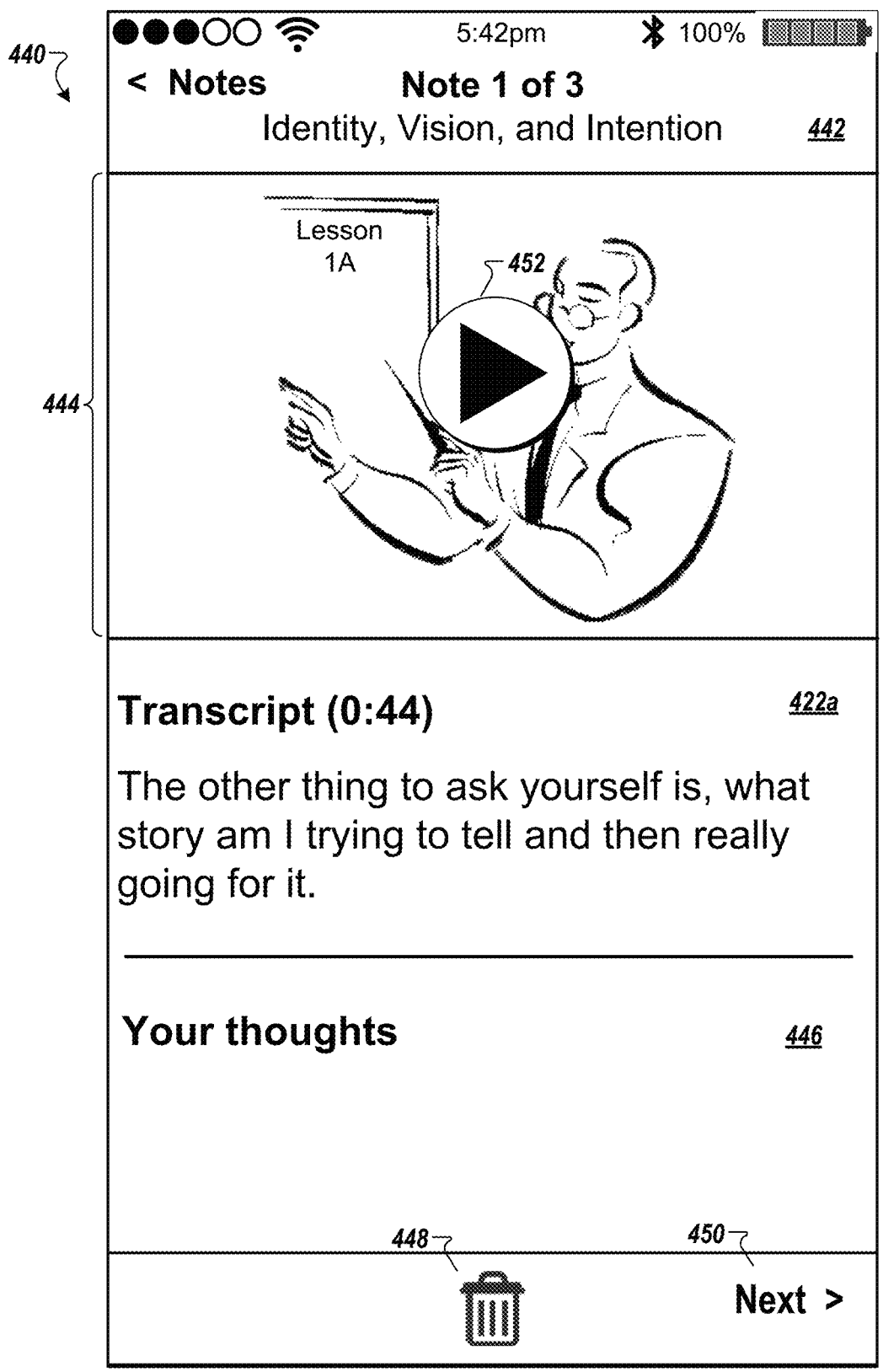
FIG. 4C shows an example screen shot of a user interface for a note.
Figure 4D:
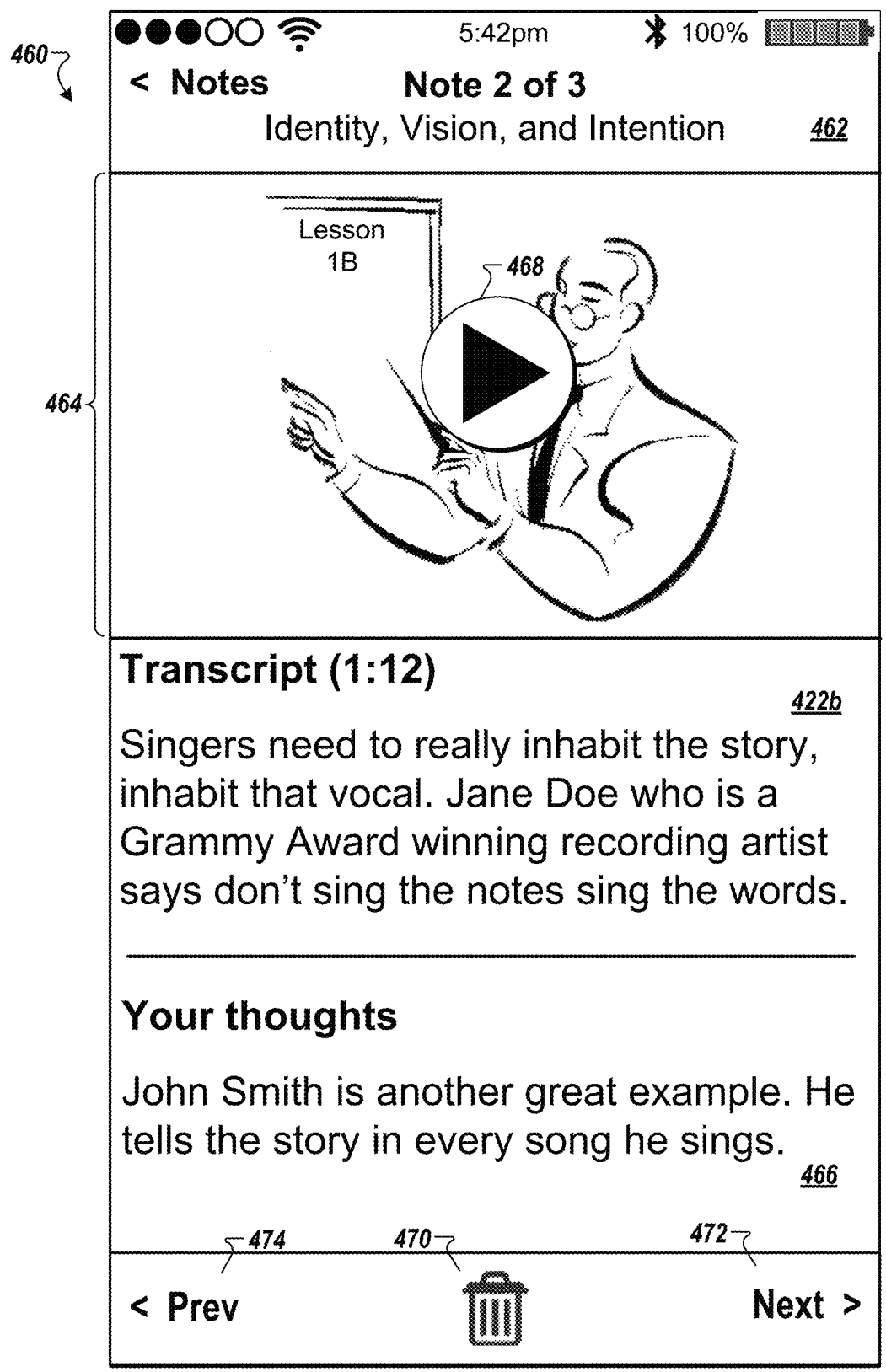
FIG. 4D shows an example screen shot of a user interface for another note whose note summary follows the note summary for the first note.
Figure 5:
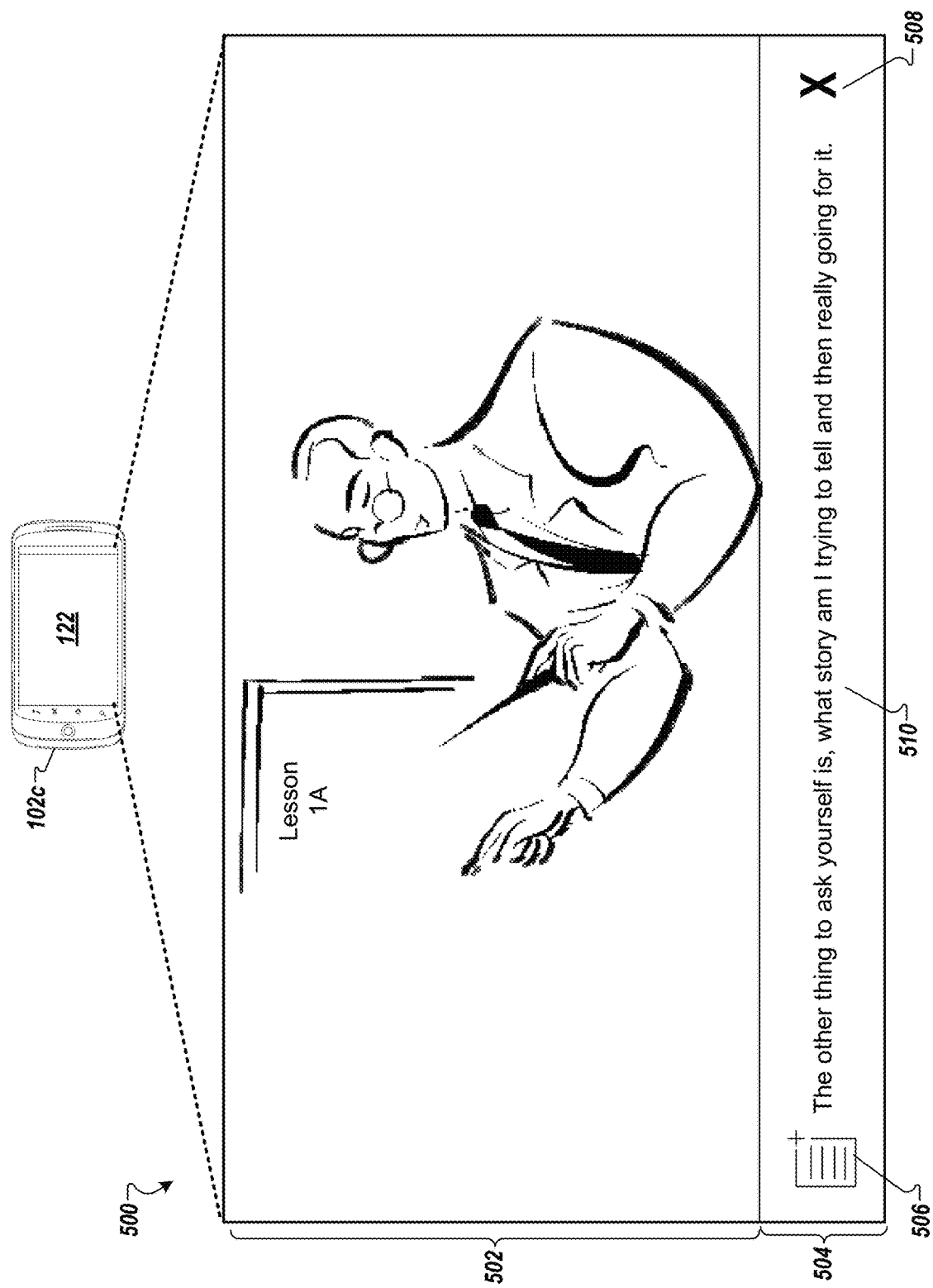
FIG. 5 shows an example screen shot of a user interface that is displayed on the display device included in the computing device when the computing device is orientated in a landscape mode of operation.

Examples of the different user interfaces for a landscape mode and a portrait mode are shown and described herein with reference to FIGS. 2A-B, FIGS. 3A-E, FIG. 4-D, and FIG. 5. Though a portrait mode of operation may be preferred for content displayed on the display device 122, content may be presented on the display device 122 in a landscape mode of operation. For example, a learner may rotate the computing device 102c by approximately 90 degrees from the orientation of the computing device 102c as shown in FIG. 1. The rotation can result in the use of the display device 122 in a landscape mode of operation. Though a landscape mode of operation may be preferred for content displayed on the display device 122, content may be presented on the display device 122 in a portrait mode of operation.

The computing device 102d can be a desktop computer system that includes a desktop computer 150, a display device 152 that can be a touchscreen, a keyboard 154, and a pointing device (e.g., a mouse 156). A learner can interact with one or more input devices and/or a touchscreen to select one or more controls that can be displayed in a user interface on the display device 152.

In some implementations, the computer system 130 can represent more than one computing device working together to perform server-side operations. For example, though not shown in FIG. 1, the system 100 can include a computer system that includes multiple servers (computing devices) working together to perform server-side operations. In this example, a single proprietor can provide the multiple servers. In some cases, the one or more of the multiple servers can provide other functionalities for the proprietor.

In some implementations, the network 116 can be a public communications network (e.g., the Internet, cellular data network, dialup modems over a telephone network) or a private communications network (e.g., private LAN, leased lines). In some implementations, the computing devices 102a-d can communicate with the network 116 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

In a non-limiting example, the online course application 164 can display the UI 114. The UI can include the forward control icon 162. A learner can select (click on) the forward control icon 162 to view notes the learner created for the online course. For example, data indicative of the selection of the forward control icon 162 can be provided to a note retrieving application 146 included in the server 142a by way of the network 116. The note retrieving application 146 can access the database 142c to retrieve notes stored for the learner that are for an online course (e.g., indicated course 170). The note retrieving application 146 can provide a summary of the notes for the learner for the online course to the computing device 102c by way of the network 116. The summary of the notes can be displayed in a user interface for the online course application 164. An example of a summary of notes for a learner as displayed in a user interface is shown, for example, in FIG. 4B.

The course application 138 can provide a video of a lecture, section, or lesson for an online course to a computing device that provided a request for the video (e.g., one of the computing devices 102a-d). For example, the online course application 164 can display in the UI 114 one or more icons representative of (associated with) respective one or more courses and/or one or more lectures, sessions, or lectures for a particular online course for selection by a user of the computing device 102c. The user can then select the icon (e.g., touch the icon on a touchscreen). The selection of the icon can launch the particular video for the online course. When launched, the computer system 130 can provide the video to the computing device 102c.

The display device 122 can display the visual content of the video for the online course and one or more speakers included in the computing device 102c can play the audio portion of the online course. The course application 138 can retrieve the video of the online course from the database 142b. The server 142a using the network 116 can provide the video to the computing device 102c.

The course application 138 can provide a time-based version of the audio content of a video of an online course to the transcript generator 168. The transcript generator 168 can generates a time-based version of the words spoken during the online course in a time-based version of a transcript for storage along with the online course in the database 142b.

The course application 138 can retrieve the transcript, or a segmented transcript in the form of subtitles or closed captioning, of the video of the online course from the database 142b. In some implementations, the course application can provide the transcript of the video of the online course synchronously with the video of the online course to the computing device 102c by way of the network 116. The transcript can be displayed synchronously with (simultaneously with) the display (the playing) of the video for the online course in the UI 114.

A note creator application 144 can receive data from a computing device (e.g., the computing device 102a-d) indicating that a learner has selected a save-a-note element while viewing the video. The note can include information about a concept (e.g., parts of a text-transcript for the concept) that was being discussed at the point of the selection of the save-a-note element and a screenshot from the part of the video that was playing when the save-a-note element was selected. The note creator application 144 can identify a specific time as related to the playing of the video and the presentation of a concept when the selection occurred. The note creator application 144 can provide a user interface for the online course application 164. The user interface can allow a learner, when creating a note, to annotate the note and to selectively save the note. The note creator application 144 can receive data from a computing device (e.g., the computing device 102a-d) indicating that a learner has selected to save the note. The note creator application 144 can save the note in association with the learner and with the online course. In some implementations, the note creator application 144 can include additional information and data in the note that can include, but is not limited to, location information (e.g., Global Positioning System (GPS) coordinates), date and/or time information (e.g., real time clock (RTC) information, calendar entry information), a learner identification (ID), an item ID, an online course ID, and metadata for the online course.

For example, a learner presses button (e.g., clicks on a button in a user interface). A learner can select a save-a-note element while viewing a video. A video image at a time of the receipt of the selection of the save-a-note element is captured and a text transcript that represents the concept being taught at time of the receipt of the selection of the save-a-note element is also captured. A current phase spoken at the at time of the receipt of the selection of the save-a-note element is used as a reference to identify one or more sentences to include as a concept. Optionally, in some cases, the learner may add comments. The video image, the text transcript, the identified one or more sentences, and the learner comments can be stored as a note.

A note retrieving application 146 can receive data from a computing device (e.g., the computing device 102a-d) by way of the network 116 indicating the selection by a learner to view the notes associated with the learner for the online course. For example, as shown in FIG. 1, a learner can select the forward control icon 162. Based on receiving the data indicating the selection by a learner to view the notes associated with the learner for the online course, the note retrieving application 146 can access the database 142c where the notes are stored and can provide a summary of available notes for the learner and for the online course for display in the UI 114. In some implementations, the note retrieving application 146 can access the database 142c where the notes are stored and can aggregate information included in notes that was collected by other users (learners) stored and stored on the database 142c. A learner can then select a particular note. The selection of the particular note from the summary of notes is provided to the note retrieving application 146 by the computing device 102c by way of the network. The note retrieving application 146 can access the database 142c to retrieve the particular note. The particular note can include, for example, an indication of a point in time in the video and notes entered by the learner. The note retrieving application 146 can instruct the course application 138 to provide the content of the online course that will begin playing the video at the point in time included in the note. The note retrieving application 146 can request that the course application 138 synchronously provide the transcript of the online course.

In some implementations, when a learner is viewing the video of the online course (or otherwise interacting with the online course) in an offline mode of operation (e.g., no network access), the course application 138 can create and store a note in a similar manner as the note creator application 144. A note created by the course application 138 can be stored in the client memory 106 for later access and viewing by the learner. In some implementations, when the learner accesses the computer system 130 by way of the network 116 operating in an online mode of operation, the course application 138 can upload one or more notes stored in the client memory 106 to the database 142*c*. In some implementations, the uploading can be performed automatically, without any intervention by the learner. In some implementations, the course application 138 can provide a user interface requesting confirmation from the learner to upload the notes. In some implementations, a learner may view or update any notes stored locally in the client memory 106. The learner can do so independent of any network connection.

Figure 2A:
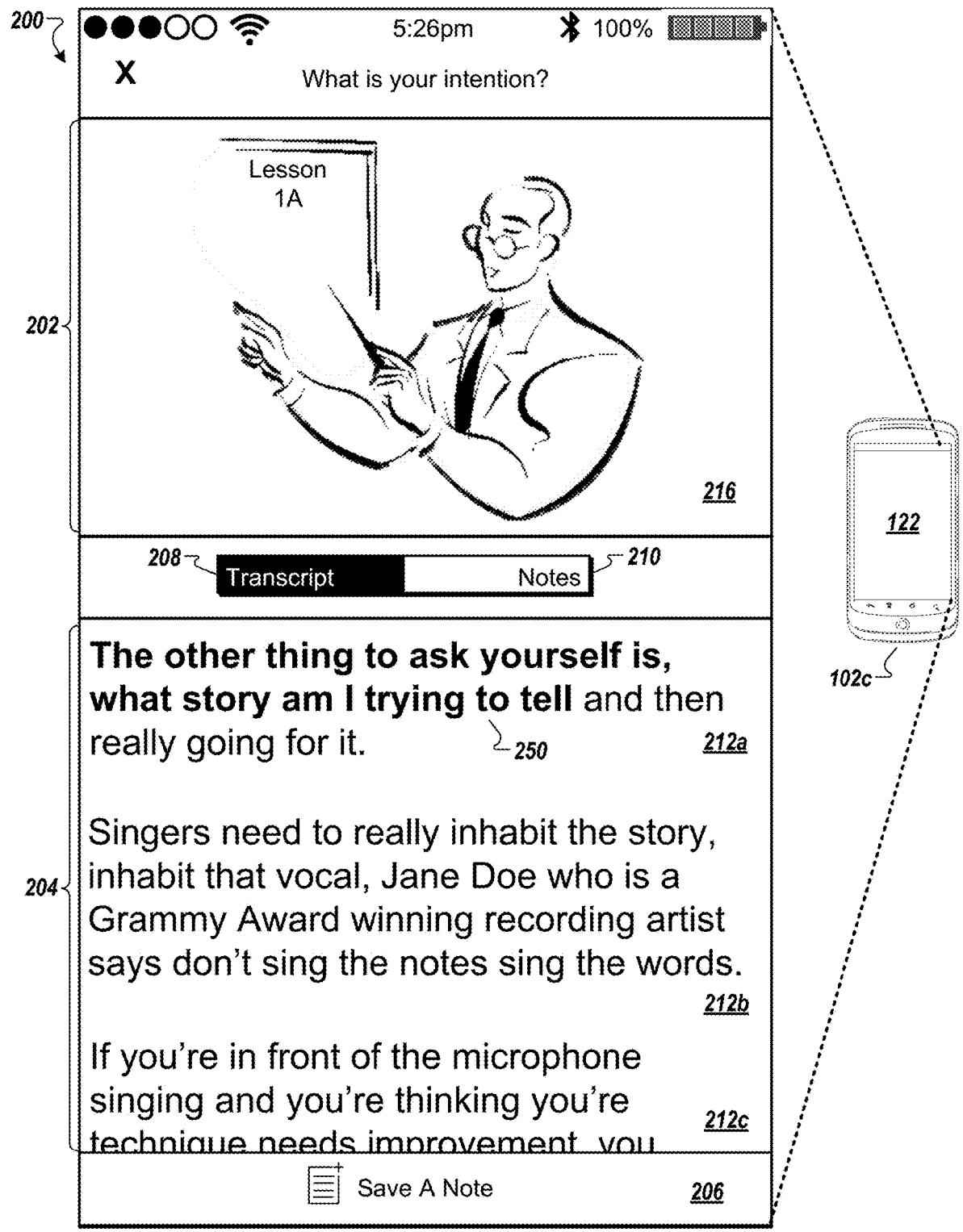
FIGS. 2A-B show example screen shots of a user interfaces that include a video area, a transcript area, and a save-a-note element.
Figure 2B:
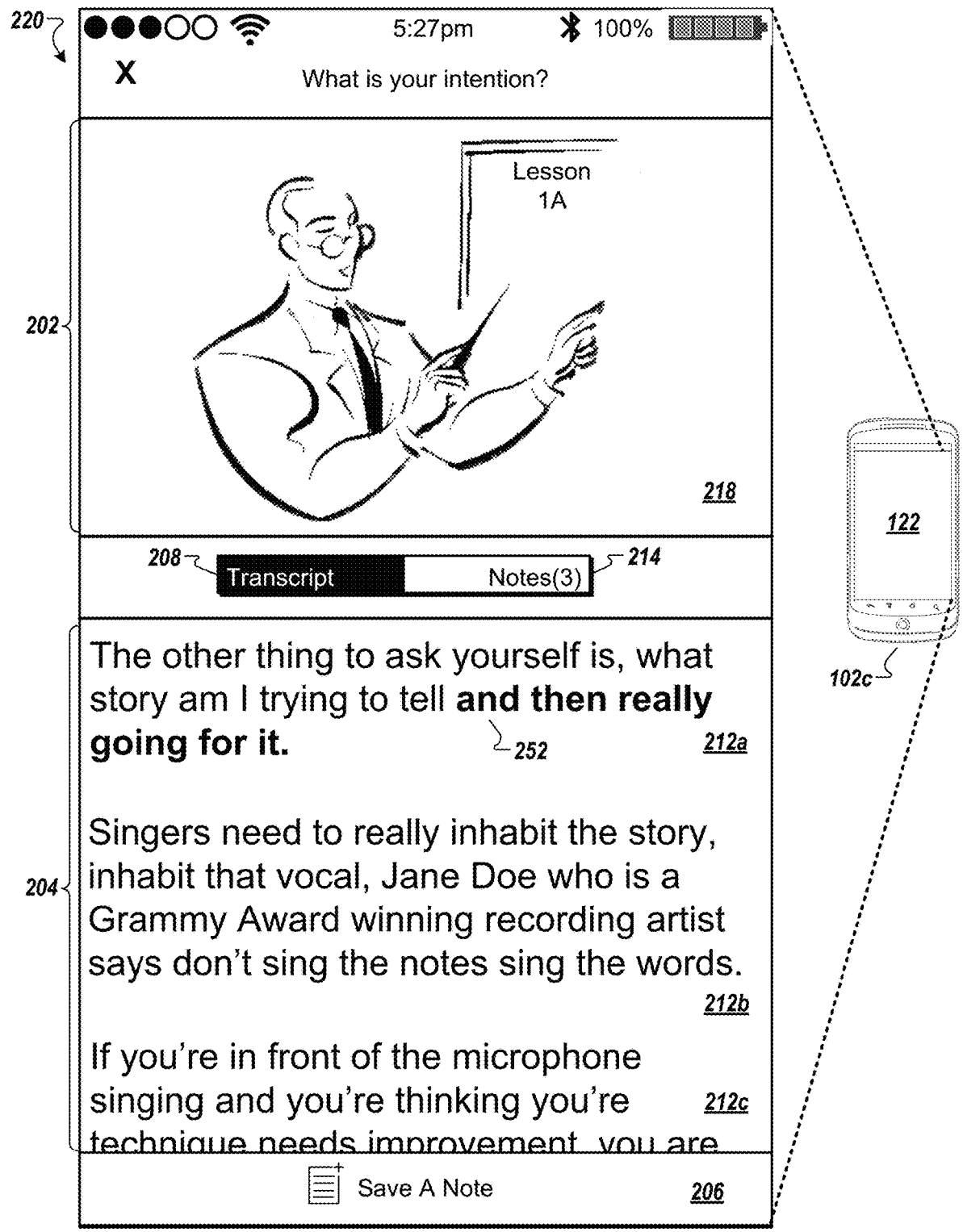

FIGS. 2A-B show example screen shots of a user interface 200 and a user interface 220, respectively, that include a video area 202, a transcript area 204, and a save-a-note element 206. Each of the user interfaces 200 and 220 also includes a transcript element 208. The user interface 200 includes a notes element 210. The user interface 220 includes an updated notes element 214.

Figure 3A:
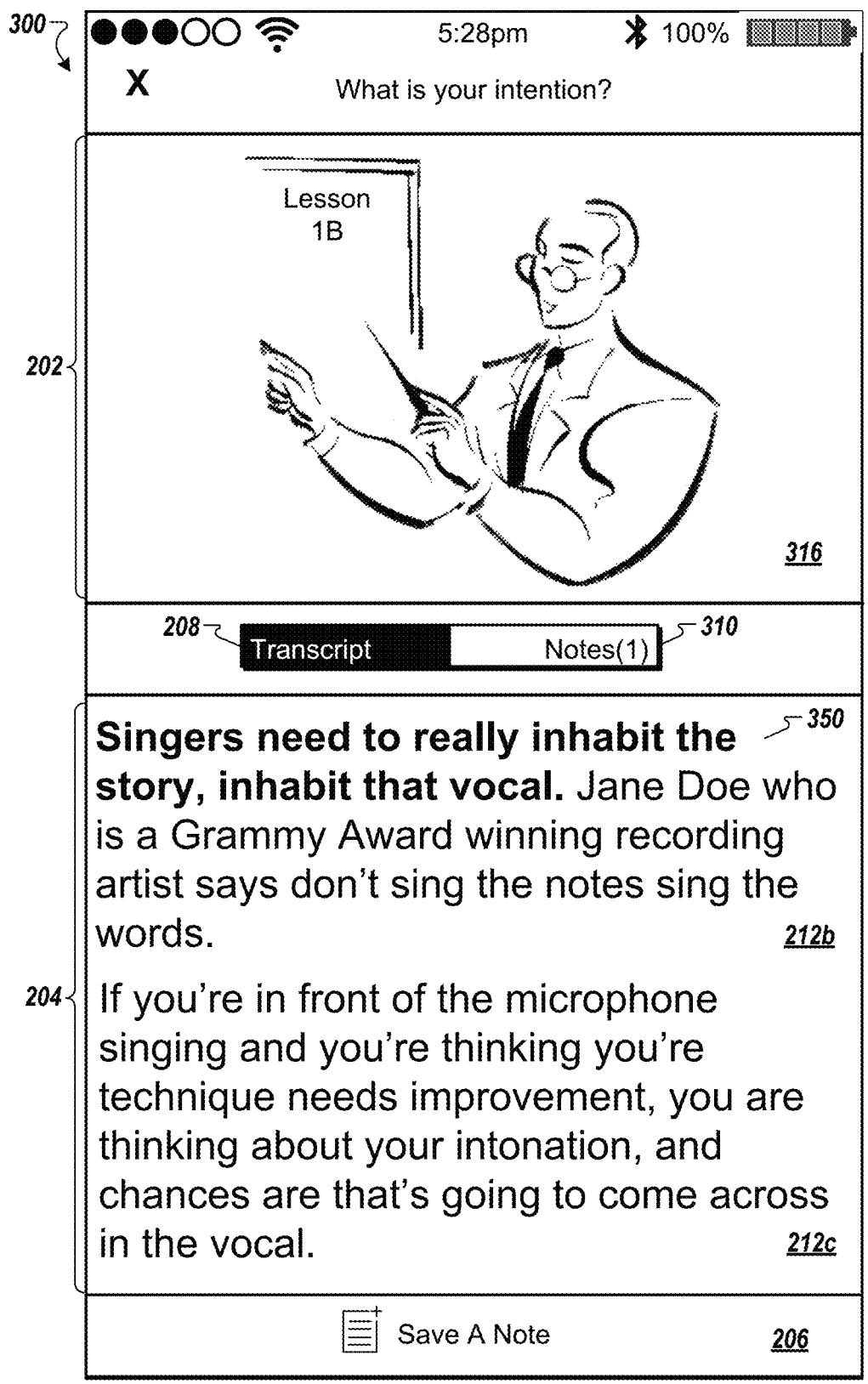
FIGS. 3A-B show additional example screen shots of user interfaces that include a video area, a transcript area, and a save-a-note element.
Figure 3B:
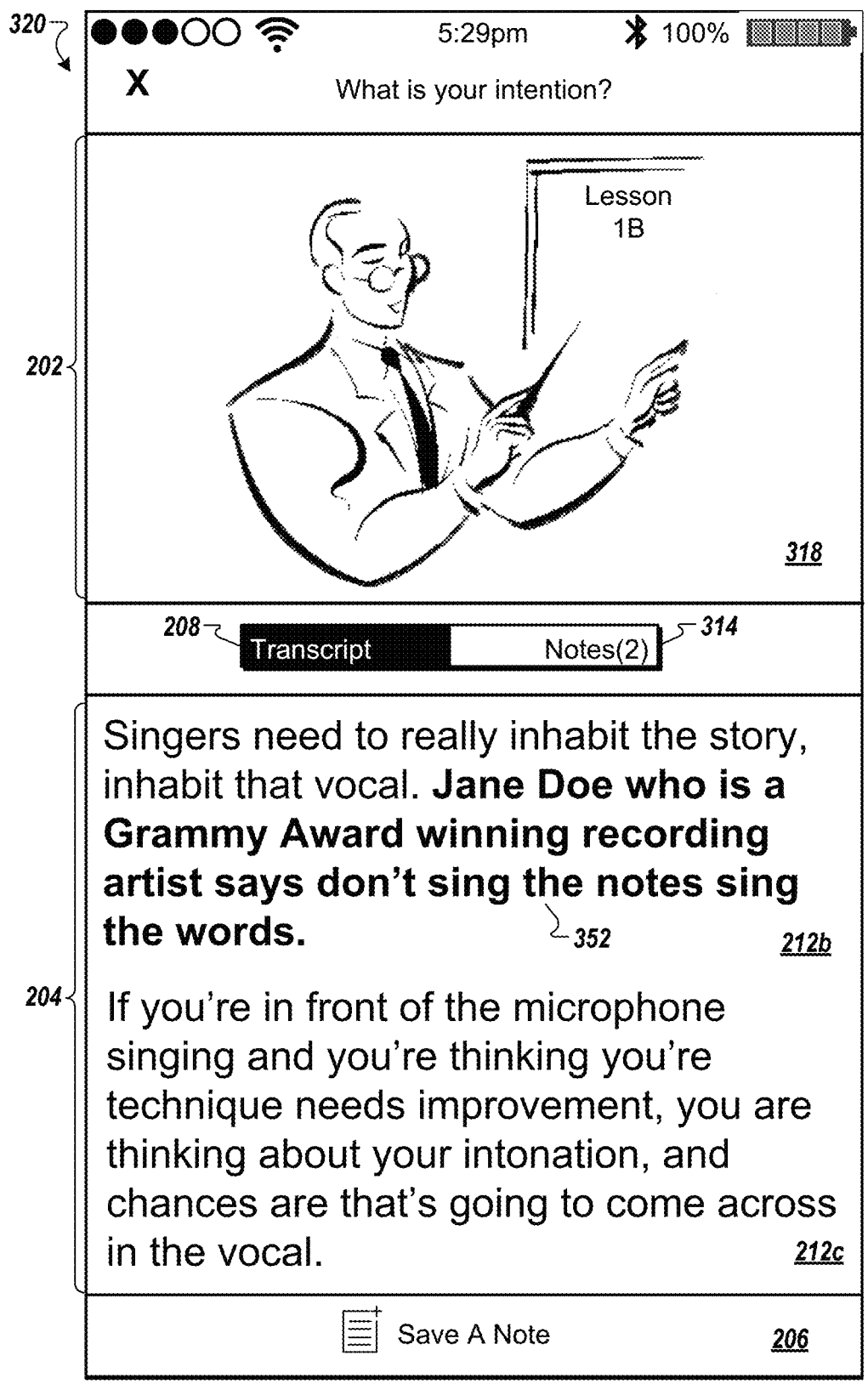

FIGS. 3A-B show additional example screen shots of a user interface 300 and a user interface 320. The user interface 300 includes a notes element 310. The user interface 320 includes an updated notes element 314. The notes element 310 and the updated notes element 314 each include an indication of a number of notes stored for the learner for the online course.

Referring to FIGS. 2A-B, for example, the user interface 200 can be displayed on the display device 122 included in the computing device 102*c*. The user interface 200 shown in FIG. 2A, and the user interfaces shown in FIG. 2B, FIGS. 3A-E, and FIGS. 4A-D can be displayed on the display device 122 when the computing device 102*c* is in a portrait mode of operation. FIG. 2A, as an example, shows the computing device 102*c* in a portrait mode orientation. The computing device 102*c* in a portrait mode of operation can display the user interfaces included in FIGS. 2A-B, FIGS. 3A-E, and FIGS. 4A-D.

The example screen shots are of the user interface 200, the user interface 220, the user interface 300, and the user interface 320, where the transcript element 208 has been selected by a learner. The selection of the transcript element 208 results in the synchronous displaying of a transcript of a video in the transcript area 204 while the video is playing (being displayed) in the video area 202.

Referring to FIG. 2A, the transcript area 204 includes sentences 212*a-c*. A phrase that is being read or spoken in the frame of the video that is being displayed (played) in the video area 202 is highlighted in the transcript area 204 (e.g., first phrase 250). One or more phases that are spoken before a highlighted phrase can be displayed and not highlighted. One or more phases that are spoken after the highlighted phrase can be displayed and not highlighted.

A transcript can include a plurality of sentences, each of which may be composed of multiple phrases. The phrases can be associated with the video and stored as a text transcript for the video in the database 142*b*. For example, the phrases can be used to provide closed captioning or subtitles on a television that can play the video. The phrases can be formed into a transcript that can be displayed in hole or in part to a user in a user interface (e.g., the user interfaces as described herein). The transcript of the phrases can be presented in a user interface in a familiar and readable form for a user. For example, a single block of text that can be considered a transcript can be divided into one or more readable chunks (e.g., one or more sentences, one or more paragraphs, etc.).

The composing of a transcript can include flattening the phrases and adding synthetic visual structuring in the form of sentences and paragraphs. In response to the selection of a save-a-note element, a phrase included in the transcript is identified (e.g., the highlighted phase displayed in the user interface). An associated time for the identified phrase is identified. The identified time is then correlated to the video.

In some implementations, phrases can span synthetic paragraph breaks. In these implementations, sentences can be correctly identified that can be broken across multiple paragraphs. When a video plays at a specific time, a subtitle associated with that time is identified, and the subtitle text is located within the transcript text. In some cases, the matching subtitle text within the transcript may have synthetically inserted paragraph breaks.

A learner can select (click on) a phrase that is included in the transcript area 204 that is not highlighted. In some implementations, a learner can scrub or seek or otherwise change the playing of the video using a control included in the user interface. The changing of the playing of the video can cause the highlighted phrase to change. The selection can cause the video playing in the video area 202 to jump to the point in the video (the frame) that corresponds to (correlates with, is synchronized with) the phrase. In some implementations, each phrase can be part of a sentence that is spoken in the video of the online course. In some implementations, each phrase can be a sentence that is spoken in the video of the online course. In some implementations, each phrase can be a plurality of sentences that are spoken in the video of the online course. In some implementations, each phrase can be a chunk of text that is a number n characters in length. Each phrase can include a plurality of words and/or a plurality of characters. In some implementations, each phrase can be a plurality of a combination of sentence fragments and full sentences. For example, a concept can include one or more sentences that can include one or more phrases.

In the examples shown in FIGS. 2A-B and FIGS. 3A-B, a video can include spoken phrases that are synchronized with a particular portion (section) of the video on a timed basis (e.g., time-synced phrases). Each time-synced phrase corresponds to (is correlated with, is associated with) a specific portion of the video. A user interface (e.g., the user interfaces 200, 220, 300, 320) can display a transcript in a transcript area (e.g., the transcript area 204). The transcript can be created by combining time-synced phrases into one or more sentences. The sentences can be combined to form one or more paragraphs. As the video plays, a time-synced phrase (e.g., a first phrase 250, a second phrase 252) included in the transcript that is displayed in the transcript area (e.g., the transcript area 204) that corresponds to a particular portion of the video that is currently playing in the video area (e.g., video area 202) can be highlighted in the user interface (e.g., the user interfaces 200, 220, 300, 320).

For example, referring to FIG. 2A, a video is playing the video area 202. A first portion of the video (e.g., at least first video frame 216) is time-synchronized to the first phrase 250 in a first sentence 212a. The first portion of the video plays from a first time-stamp of 34 seconds to a second time stamp of 37 seconds. The first portion of the video is time-synced with the first phrase 250 and starts at the first time-stamp of 34 seconds and plays for three seconds. The first phrase 250 is highlighted in the transcript area 204 while the first portion of the video is playing in the video area 202.

For example, referring to FIG. 2B, a second portion of the video (e.g., at least second video frame 218) plays from a third time-stamp of 38 seconds to a fourth time-stamp of 40 seconds. The second portion of the video (e.g., at least second video frame 218) is time-synchronized to a second phrase 252 in the first sentence 212a. The second portion of the video is time-synced with the second phrase 252 and starts at the second time-stamp of 38 seconds and plays for two seconds. The second phrase 252 is highlighted in the transcript area 204 while the second portion of the video is playing in the video area 202. As described, the playing of the second portion of the video follows the playing of the first portion of the video.

Referring to FIG. 2A, a learner can select (click on) the save-a-note element 206 when the first phrase 250 is highlighted. Doing so creates a note that includes an indicator of the point in time in the video (e.g., the frame) when the highlighted phrase (e.g., the first phrase 250) is spoken. In addition, the note can include a point in time for the concept discussed within the selected phrase. The note can then include at least a sentence that includes the highlighted first phrase 250. For example, the note can include the highlighted first phrase 250 and the second phrase 252, resulting in the inclusion of the first sentence 212a. The note includes a screen shot of the frame during which the highlighted phrase is spoken (e.g., a screen shot of first video frame 216).

Referring to FIG. 2B, the notes element 210 can be updated to indicate a number of notes that have been created and stored for the learner for the online course (e.g., updated notes element 214). For example, in some cases, the learner created a note by selecting the save-a-note element 206 when the first phrase 250 was highlighted as shown in FIG. 2A. For example, in some cases, the learner created a note by selecting the save-a-note element 206 when the second phrase 252 was highlighted. In some situations, a learner may tend to realize the importance of a concept as the learner hears the end of the concept, rather than as the learner hears the beginning of the concept. As the video progress (continues to play), the phrases included in the transcript area 204 are updated. For example, the first phrase 250 may no longer be highlighted as it is not the currently spoken phrase and the second phrase 252 is highlighted as it is now the currently spoken phrase. In addition, the video displays a different frame (e.g., second video frame 218). A learner can continue to watch the video of the online course, selecting the save-a-note element 206 when a phrase considered important to the learner is highlighted. As described, each saved note can include an indication of the point in time in the video when the phrase was spoken along with the transcript of at least the highlighted phrase. A transcript of the concept being discussed is stored, which can include not only the captured phrase but the complete sentence that includes the phrase. In addition, the stored transcript of the concept can include one or more sentences adjacent to the complete sentence if those sentences are deemed to be important to the formation of the concept.

Figure 2C:
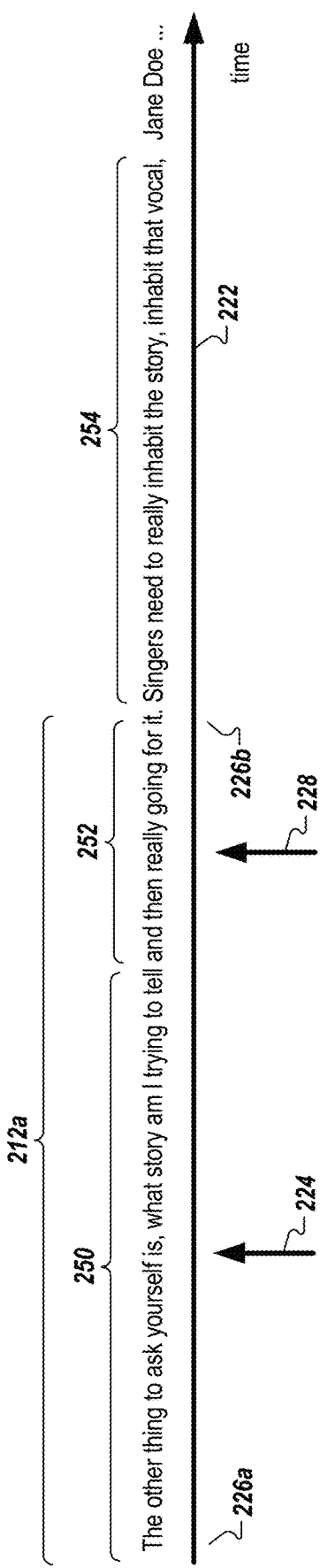
FIG. 2C is a block diagram showing an example of how a note creator application can determine an amount of text included in a transcript of a video of an online course for storing in a note.

FIG. 2C is a block diagram showing an example of how a note creator application (e.g., the note creator application 144 as shown in FIG. 1) can determine an amount of text included in a transcript of a video of an online course for storing in a note. The amount of text stored can be based on when the note creator application (e.g., the note creator application 144) receives an indication of a selection of a save-a-note element (e.g., the save-a-note element 206) included in a user interface for the video for the online course.

FIG. 2C shows that as the time that the video is playing progresses (e.g., as shown by a timeline 222) the spoken words change as shown by the first phrase 250 being spoken before the second phrase 252, and a third phrase 254 being spoken after the second phrase 252. When an indication of the selection of the save-a-note element 206 is received, the time-synced phrase that is being spoken in the video that is playing in the video area 202 at the time of the receipt of the indication of the selection (the highlighted phrase) is identified.

For example, referring to FIG. 2A and FIG. 2C, the first phrase 250 is identified as the active time-synced phase when a first indication 224 of a selection is received. A sentence that includes the first phrase 250 is also identified (e.g., the first sentence 212a). A note is created and saved, based on the received first indication 224 of the selection of the save-a-note element 206. The note can include the first sentence 212a that includes the first phrase 250. In some cases, the second phrase 252 is identified as the active time-synced phase when a first indication 224 of a selection is received. In these cases, a sentence that includes the second phrase 252 is identified (e.g., the first sentence 212a). A note is created and saved, based on the received first indication 224 of the selection of the save-a-note element 206.

For example, referring to FIG. 2B and FIG. 2C, the second phrase 252 is identified as the active time-synced phase when a second indication 228 of a selection is received. A sentence that includes the second phrase 252 is also identified (e.g., the first sentence 212a). A note is created and saved, based on the received second indication 228 of the selection of the save-a-note element 206. The note can include the first sentence 212a that includes the second phrase 252. A sentence is included in a note in order to capture an entire concept being discussed in the video when the indication of the selection of the save-a-note element 206 is received.

Referring to FIGS. 2A-B, an indication of a selection of the save-a-note element 206 (e.g., the first indication 224) can be received by the note creator application 144 and correlated to the first phrase 250. The note creator application 144 identifies all sentence ends for all sentence fragments included in the first phrase 250 (e.g., determines if there are any period characters in the characters included in the first phrase 250). The note creator application 144 determines that the full transcript concept for the note includes at least the text from a start point 226a to an end point 226b. The note creator application 144 then expands the first phrase 250 to include the second phrase 252, completing the sentence.

In some implementations, the note creator application 144 can then identify a concept that includes the first phrase 250 and the second phrase 252. In some implementations, additional sentences can be saved in the note. The identification of the additional sentences can be based on determining that a particular phrase (e.g., the first phrase 250, the second phrase 252) is part of a concept that was being discussed when an indication of a save-a-note element (e.g., the first indication 224, the second indication 228, respectively) was received by a note creator application (e.g., the note creator application 144). For example, the additional sentences can be sentences that are included in the transcript sequentially before and/or after the sentence (e.g., sentences adjacent to the first sentence 212*a*).

In some implementations, the note creator application 144 can define a limit on a number of characters (a threshold number of characters) from a transcript of the online course that can be included (stored) in an individual note. In these implementations, for example, if a number of characters included between the start point 226*a* and the end point 226*b* does not exceed the threshold number of characters, additional phrases and/or sentences can be included in the note until the threshold number of characters is reached (e.g., the third phrase 254).

Referring to FIGS. 3A-B, in a similar manner as described in FIGS. 2A-B, a learner can select (click on) the save-a-note element 206 when a phrase 350 is highlighted. The phrase 350 is included in the sentence 212*b* that is included in a transcript of the online course and shown in the transcript area 204. Selecting the save-a-note element 206 creates a note that includes an indicator of the point in time in the video (the frame) when the highlighted phrase (e.g., the phrase 350) is spoken. The note includes at least the sentence (e.g., the sentence 212*b*) that includes the highlighted phrase 350. The note includes a screen shot of a frame during which the highlighted phrase is spoken (e.g., a screen shot of frame 316).

Referring to FIGS. 3A-B, the notes element 310 can be updated to indicate a number of notes that have been created and stored for the learner for the online course (e.g., updated notes element 314). As the video progress (continues to play), the phrases included in the transcript area 204 are updated. For example, referring to FIGS. 2A-B, the first sentence 212*a* including the first phrase 250 and the second phrase 252 is no longer displayed in the transcript area 204. In addition, the phrase 350 is no longer highlighted as it is not the currently spoken phrase. The phrase 352 is highlighted, as it is now the currently spoken phrase. In addition, the video displays a different frame (e.g., frame 318).

While watching the video of the online course, a learner can select the updated notes element 314. The note retrieving application 146 can receive the indication of the selection of the updated notes element 314. The note retrieving application 146 can provide a summary of the notes for the learner that are associated with the online course that are included (stored) in the database 142*c*. The playing of the video of the online course can be paused in order for the learner to interact with previously stored notes.

Figure 3C:
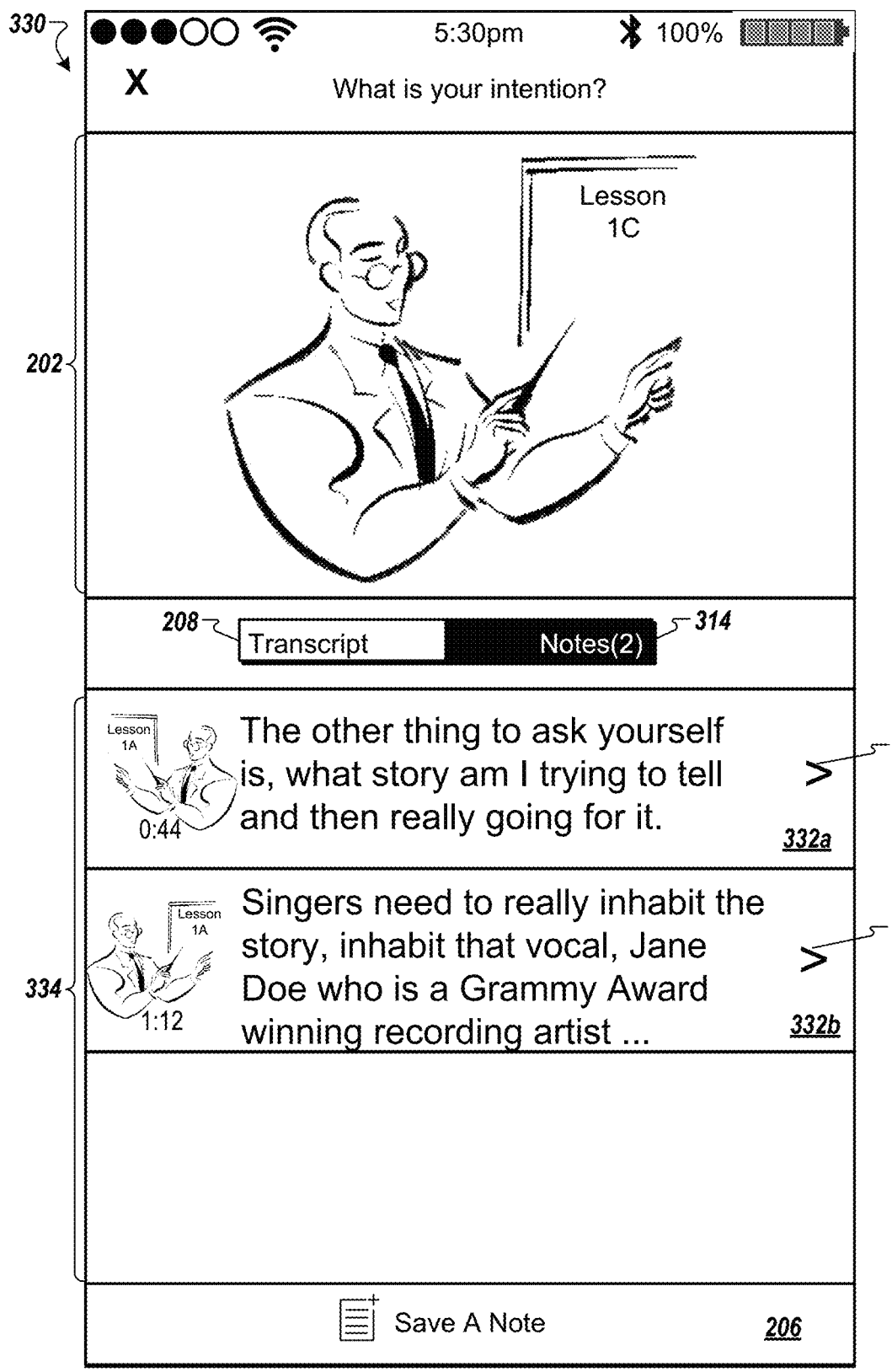
FIG. 3C shows an example screen shot of a user interface that includes note summaries for a learner of an online course.

FIG. 3C shows an example screen shot of a user interface 330 that includes note summaries 332*a-b* for a learner of an online course. Referring to FIG. 1, the note retrieving application 146 can provide the note summaries 332*a-b* to the computing device (e.g., the computing device 102*c*) by way of the network 116 for display in a note summary section 334 included in the user interface 330 for display on the display device 122 of the computing device 102*c*. The note retrieving application 146 can provide the note summaries 332*a-b* in response to the receiving of an indication of the selection of the updated notes element 314. The note summaries 332*a-b* can be saved notes for a learner of an online course.

Figure 3D:
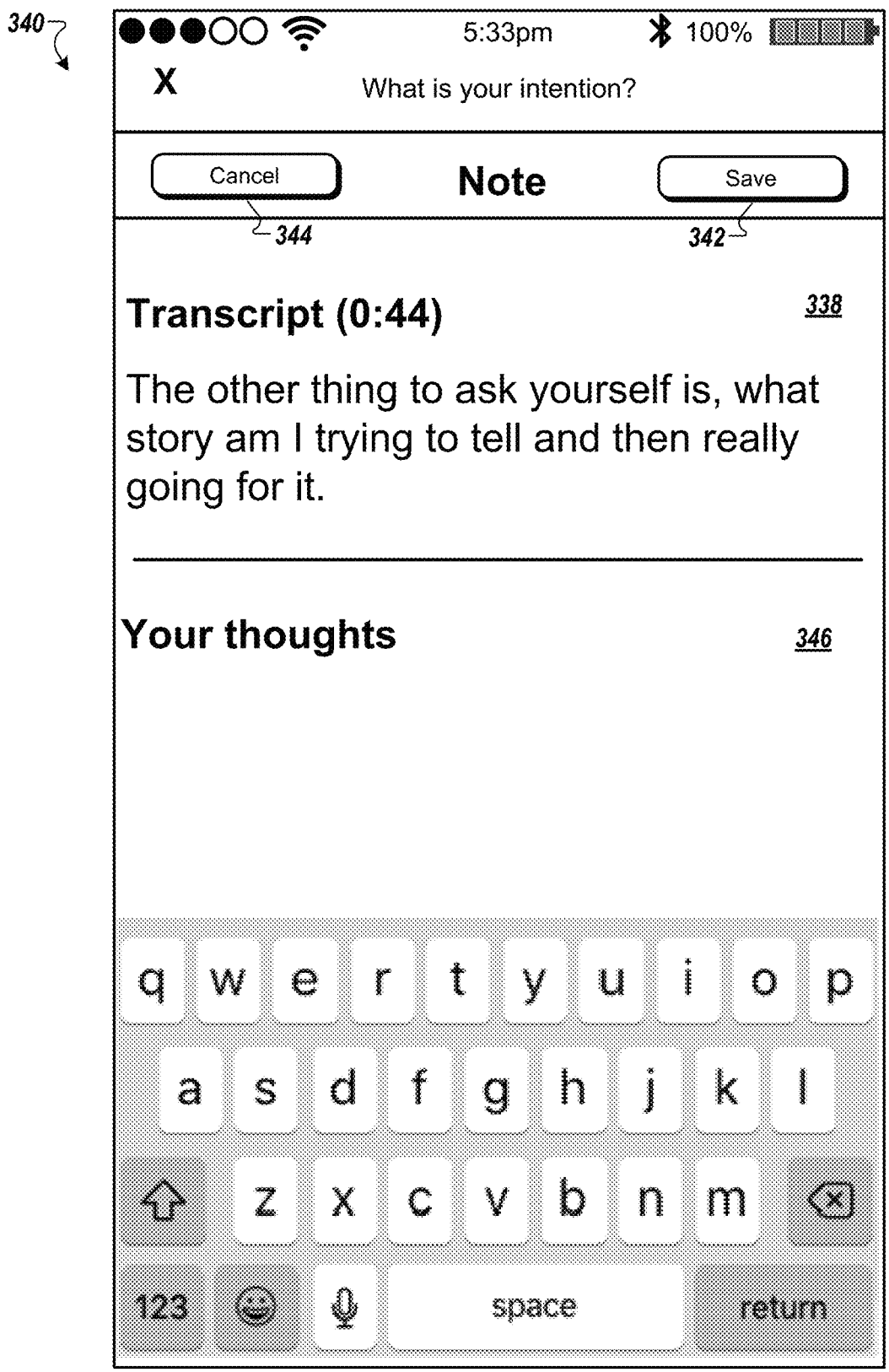
FIG. 3D shows an example screen shot of a user interface that includes a portion of a transcript and a provision to add learner annotations included in a note associated with the note summary.

FIG. 3D shows an example screen shot of a user interface 340 that includes a portion of a transcript (transcript portion 338) and a provision to add learner annotations (learner annotations 346) included in a note associated with the note summary 332*a*. The provision to add learner annotations (learner annotations 346) allows a learner to add comments to a note. Referring to FIG. 3C, a learner can select (click on) a forward control icon 336 in order to view and possibly annotate the learner annotations 346. Once completed, the learner can choose to select (click on) a save option 342 to save the learner annotations 346 with the note. In some cases, the learner can choose to select (click on) a cancel option 344 that will not save the learner annotations 346 that the learner just added with the note.

Figure 3E:
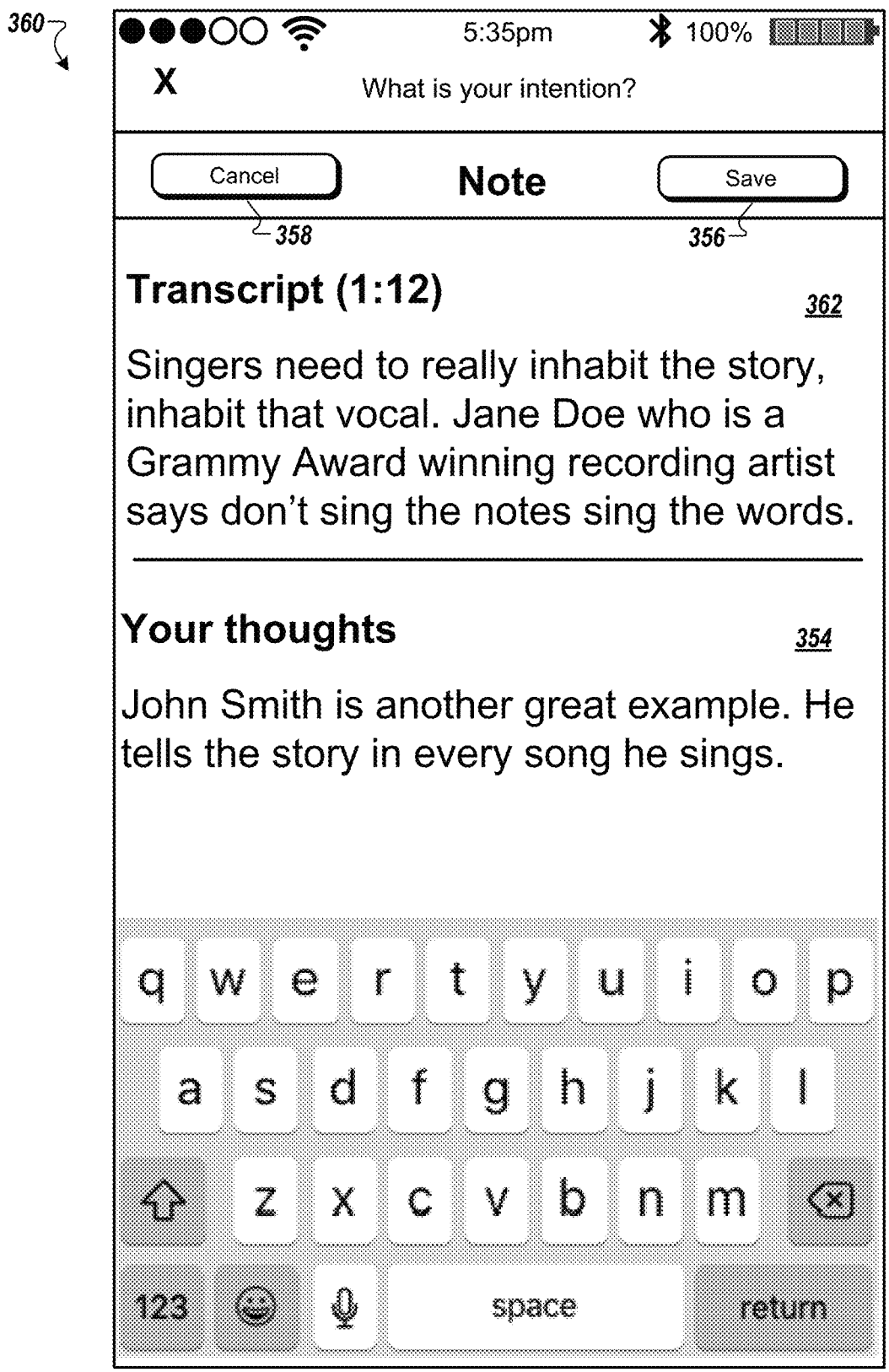
FIG. 3E shows an example screen shot of another user interface that includes a portion of a transcript and learner annotations included in a note associated with the note summary.

FIG. 3E shows an example screen shot of another user interface 360 that includes a portion of a transcript (transcript portion 362) and learner annotations (learner annotations 354) included in a note associated with the note summary 332*b*. Referring to FIG. 3C, a learner can select (click on) a forward control icon 348 in order to view and possibly annotate the learner annotations 354. In the example shown in FIG. 3E, the note already includes learner annotations 354. The learner may choose to add to, delete, or edit the learner annotations 354. Once completed, the learner can choose to select (click on) a save option 356 to save the learner annotations 354 with the note. In some cases, the learner can choose to select (click on) a cancel option 358 that will not update the learner annotations 354.

In some implementations, referring to FIGS. 2A-B and FIGS. 3A-B, a learner can select (click on) a save-a-note element (e.g., the save-a-note element 206) when a particular phrase (e.g., the first phrase 250, the second phrase 252, the phrase 350, the phrase 352) is highlighted. Selecting the save-a-note element 206 creates a note that includes an indicator of the point in time in the video (the frame) when the highlighted phrase is spoken. The note includes at least the sentence that includes the highlighted phrase. The note includes a screen shot of the frame during which the highlighted phrase is spoken. The learner can create a note with a single tap (a single selection of the save-a-note element) and can continue to watch the video of the online course without having to pause the playing of the video. As described herein, the learner has opportunities at a later time to view and annotate all saved notes. This mode of operation can be referred to as a quick capture mode.

Referring to FIG. 3D, in some implementations, the user interface 340 can be presented to the learner in response to the selection of a save-a-note element (e.g., the save-a-note element 206) while watching the video of the online course. In these implementations, the learner can add notes to or annotate a note at the time of the creation of the note. The playing of the video will be paused while the learner adds comments to the note (annotates the note, adds learner annotation to the note). This mode of operation can be referred to as a capture and annotate mode. Once the learner has completed the annotation of the note, the learner can return to the watching of the video of the online course as the playing of the video will resume.

Referring to FIG. 3E, at a point in time after the creation of the note, a learner can select a notes element (e.g., the updated notes element 214, the notes element 310, the updated notes element 314) included in a user interface displayed on a display device (e.g., the display device 122) included in a computing device (e.g., the computing device 102*c*). In response, one or more note summaries can be included in a user interface displayed on a display device (e.g., the display device 122) included in a computing device (e.g., the computing device 102*c*). The note retrieving application 146 can provide the note summaries in response to the receiving of an indication of the selection of a notes element. As described with reference to FIGS. 3C-E, a learner can select (click on) a forward control icon associated with a note summary in order to view and possibly annotate learner annotations included in the note.

FIG. 4A shows an example screen shot of a user interface 400 for an online course. The user interface 400 includes a notes element 402 that includes a forward control icon 404. A learner can select (click on) the forward control icon 404 to display a list of note summaries.

FIG. 4B shows an example screen shot of a user interface 420 that includes note summaries 422a-c for a first section (or first lecture) 424 for an online course and note summaries 426a-c for a second section (or second lecture) 428 for an online course. A learner can interact with the note summaries 422a-c and the note summaries 426a-c to view and/or update saved notes. In the non-limiting example shown in FIG. 4B, the notes can be organized for a learner based on the course item (e.g., the online course section, the online course lecture). As described herein with reference to FIG. 3C, a learner can select (click on) a forward control icon (e.g., forward control icons 430a-c and forward control icons 432a-c) associated with a note summary (e.g., the note summaries 422a-c and the note summaries 426a-c, respectively) in order to view and possibly annotate the learner annotations associated with each note summary.

In addition or in the alternative, a learner can select (click on) a screen shot icon (e.g., screen shot icons 434a-c and screen shot icons 436a-c) in order to watch the video of the online course starting at the point in time in the video that was saved in the note and synchronized with the stored section of the transcript. In addition, the user interface can display the stored section of the transcript and any added learner annotations while the video of the online course begins playing at the point in time in the video that was stored in the note.

FIG. 4C shows an example screen shot of a user interface 440 for a note (e.g., first note 442). Referring to FIG. 4B, a learner can select (click on) the screen shot icon 434a included in the note summary 422a. For example, referring to FIG. 1, the note retrieving application 146 can receive an indication of the selection of the screen shot icon 434a included in the note summary 422a for the first note 442. The indication of the selection can be provided by the computing device 102c by way of the network 116 to the computer system 130, and specifically to the note retrieving application 146. The note retrieving application 146 can determine that the learner would like to review and possibly annotate the first note 442. The note retrieving application 146 can access the information and data for the first note 442 that is stored in the database 142c for the learner for the online course. Included in the stored information is the point in time in the video that was saved in the first note 442 and the section of the transcript that was stored in the first note 442. The note retrieving application 146 can interface with the course application 138 in order to access the video for the online course stored in the database 142b.

The course application 138 can provide the video for the first section 424 for the online course to the computing device 102c for display in the user interface 400 in a video area 444. The note retrieving application 146 can provide the point in time to begin the playing of the video for the first section 424. The note retrieving application 146 can provide the captured transcript as included in the note summary 422a and any learner annotations 446. In this example, the learner did not enter any additional learner annotations. The learner can select a play icon 452 to start playing the video of the online course from the point in time saved in the first note 442.

A learner may select (click on) a delete icon 448 that, when selected, can delete the first note 442. Deleting the first note 442 can included deleting (erasing, removing) the first note 442 from the database 142c. A learner can select a next icon 450 that, when selected, can display the next note in the note summary. In this example, a second note 462 associated with the note summary 422b would be displayed as shown in FIG. 4D.

FIG. 4D shows an example screen shot of a user interface 460 for another note (e.g., second note 462) whose note summary follows the note summary for the first note 442. Referring to FIG. 4C, in a similar manner, the user interface 460 can display the video for the first section 424 for the online course in a video area 464. The note retrieving application 146 can provide the point in time to begin the playing of the video for the first section 424. The note retrieving application 146 can provide the captured transcript as included in the note summary 422b and any learner annotations 466. The learner can select a play icon 468 to start playing the video of the online course from the point in time saved in the second note 462.

A learner may select (click on) a delete icon 470 that, when selected, can delete the second note 462. Deleting the second note 462 can included deleting (erasing, removing) the second note 462 from the database 142c. A learner can select a next icon 472 that, when selected, can display the next note in the note summary. In this example, a third note associated with the note summary 422c would be displayed in a user interface. A learner can select a previous icon 474 that, when selected, can display the previous note in the note summary (e.g., display the first note 442 as shown in FIG. 4C).

FIG. 5 shows an example screen shot of a user interface 500 that is displayed on the display device 122 included in the computing device 102c when the computing device 102c is orientated in a landscape mode of operation.

Referring to FIG. 2A, the example screen shot of the user interface 200 is displayed as the user interface 500 when the computing device 102c is in a landscape mode of operation. A video area 502 shows (plays) the video of the online course. A transcript area 504 displays a transcript of the video that is synchronized with the video of the online course that is being displayed (played) in the video area 502. In the landscape mode of operation, the transcript area 504 includes a single phrase 510 (e.g., a single sentence). In some implementations, the learner can choose to turn off the transcript (select a hide (close) transcript icon 508), eliminating the transcript area 504 and allowing the video area 502 to occupy the entire available screen area of the display device 122. A learner can select a save-a-note icon 506 that can function in a way similar to the save-a-note elements described with reference to FIGS. 2A-B and FIGS. 3A-C by saving a note while the learner is watching the video of the online course.

When viewing the video of the online course on a computing device in a landscape mode of operation, a learner has the option of turning the display of the transcript of the video on or off.

In general, the transcript of the video of the online course can be displayed in a default language as selected by a learner. For example, a learner may configure interaction with the online course for a particular language that can be considered the default language. In some implementations, if the transcript of the video of the online course is not available in the default language, the transcript of the video may be displayed in a language that is associated with the computing device that the user is using to view the video. If the transcript of the video of the online course is not available in the language associated with the computing device, a transcript of the video may not be available for the online course. For example, in some cases, a message in the default language can be presented to the learner in the transcript area of the user interface informing them of the lack of a transcript. For example, in other cases, a message in the language associated with the computing device that the user is using to view the video can be presented to the learner in the transcript area of the user interface informing them of the lack of a transcript.

When a transcript of the video of the online course is not available, a learner is still able to save a note. For example, a user interface can still include a save-a-note element that when selected can add a note that will be correlated with (associated with) the video of the online course at the point in time in the video when the control was selected by the learner. In addition, the learner can add a learner annotation that will be correlated with (associated with) the video of the online course at the point in time when the control was selected by the learner.

Though described referring to videos, smart bookmarks can be used with audio only content and other content that may have an associated transcript. In these cases, a note can include a value that is a pointer to a specific part of the content. For example, the value can be a cursor index to the identified part of the content.

Figure 6:
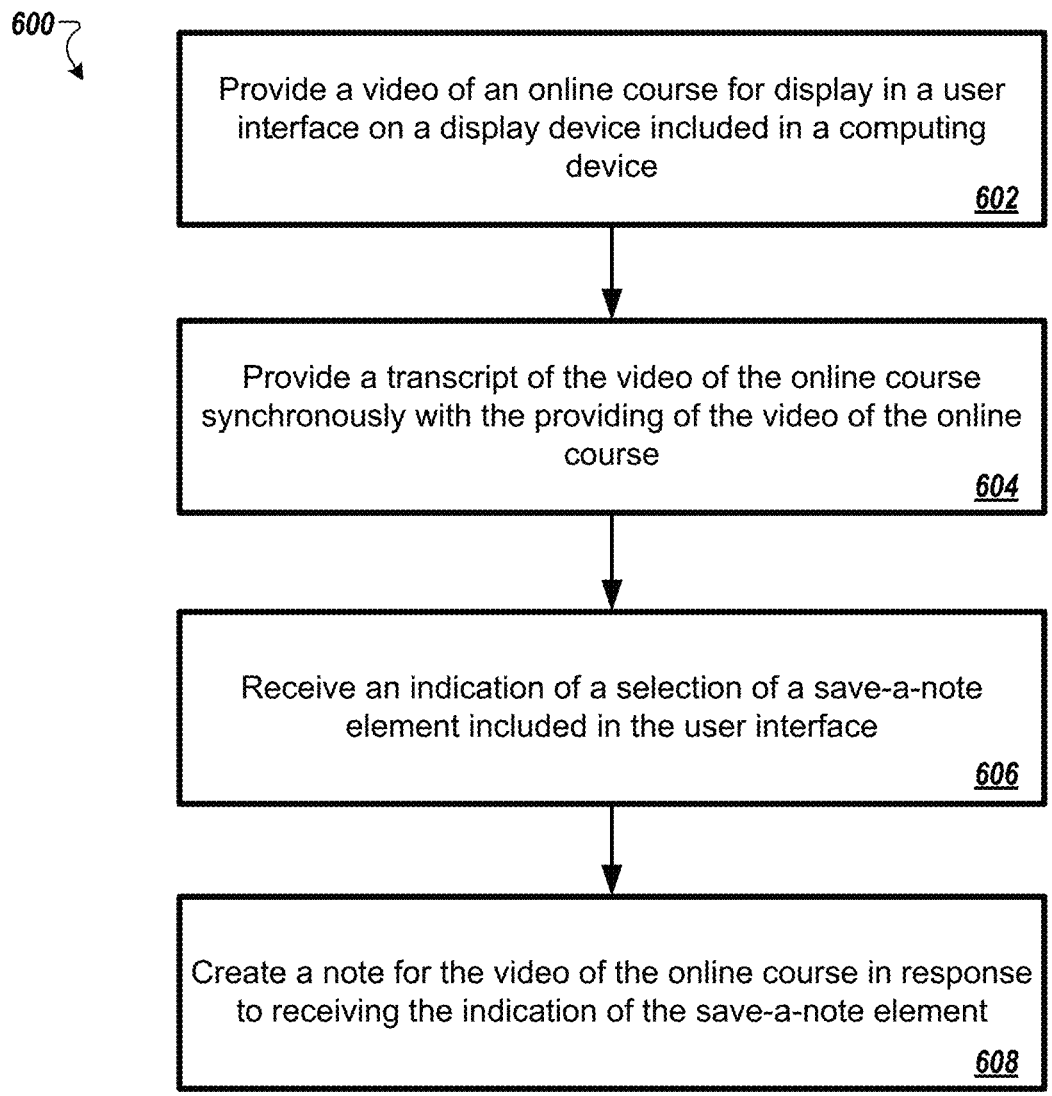
FIG. 6 is a flowchart that illustrates a method for generating (creating) a note for a video of an online course.

FIG. 6 is a flowchart that illustrates a method 600 for generating (creating) a note for a video of an online course. In some implementations, the systems described herein can implement the method 600. For example, the method 600 can be described referring to FIGS. 1, 2A-C, 3A-E, 4A-D and 5.

A video of an online course is provided by a computer system and to a computing device for display in a user interface on a display device included in the computing device (block 602). For example, referring to FIG. 1, the course application 138 can access the database 142b (the online course repository) to retrieve the video of the online course. The computer system 130 can provide the video to the computing device 102c by way of the network 116. The computing device 102c can display (play) the video in a user interface (e.g., a user interface of the provided by the online course provider) on the display device 122.

A transcript of the video of the online course is provided, by the computer system and to the computing device, synchronously with the providing of the video of the online course (block 604). The transcript can be displayed in the user interface with the video of the online course. For example, the course application 138 can access the database 142b (the online course repository) to retrieve the transcript of the video of the online course. The computer system 130 can provide the transcript of the video to the computing device 102c by way of the network 116, synchronously with the providing of the video of the online course. The computing device 102c can display the transcript of the video in a user interface (e.g., a user interface of the provided by the online course provider) on the display device 122. The user interface can be the same user interface that displays the video of the online course. Examples of such user interfaces as shown with reference to FIGS. 2A-B, FIGS. 3A-B, and FIG. 5.

An indication of a selection of a save-a-note element included in the user interface is received by the computer system and from the computing device (block 606). For example, a learner can select a save-a-note element (e.g., the save-a-note element 206 the save-a-note icon 506) included in the user interface.

A note for the video of the online course is created in response to receiving the indication of the save-a-note element (block 608). The note includes an indicator of a frame in the video when a particular phrase included in the transcript of the video is spoken, the particular phrase, and a screen shot of the frame. For example, the note creator application 144 can create a note (e.g., the first note 442, the second note 462). In addition, the note creator application can store the note in the database 142c for the learner in association with the video of the online course.

Figure 7:
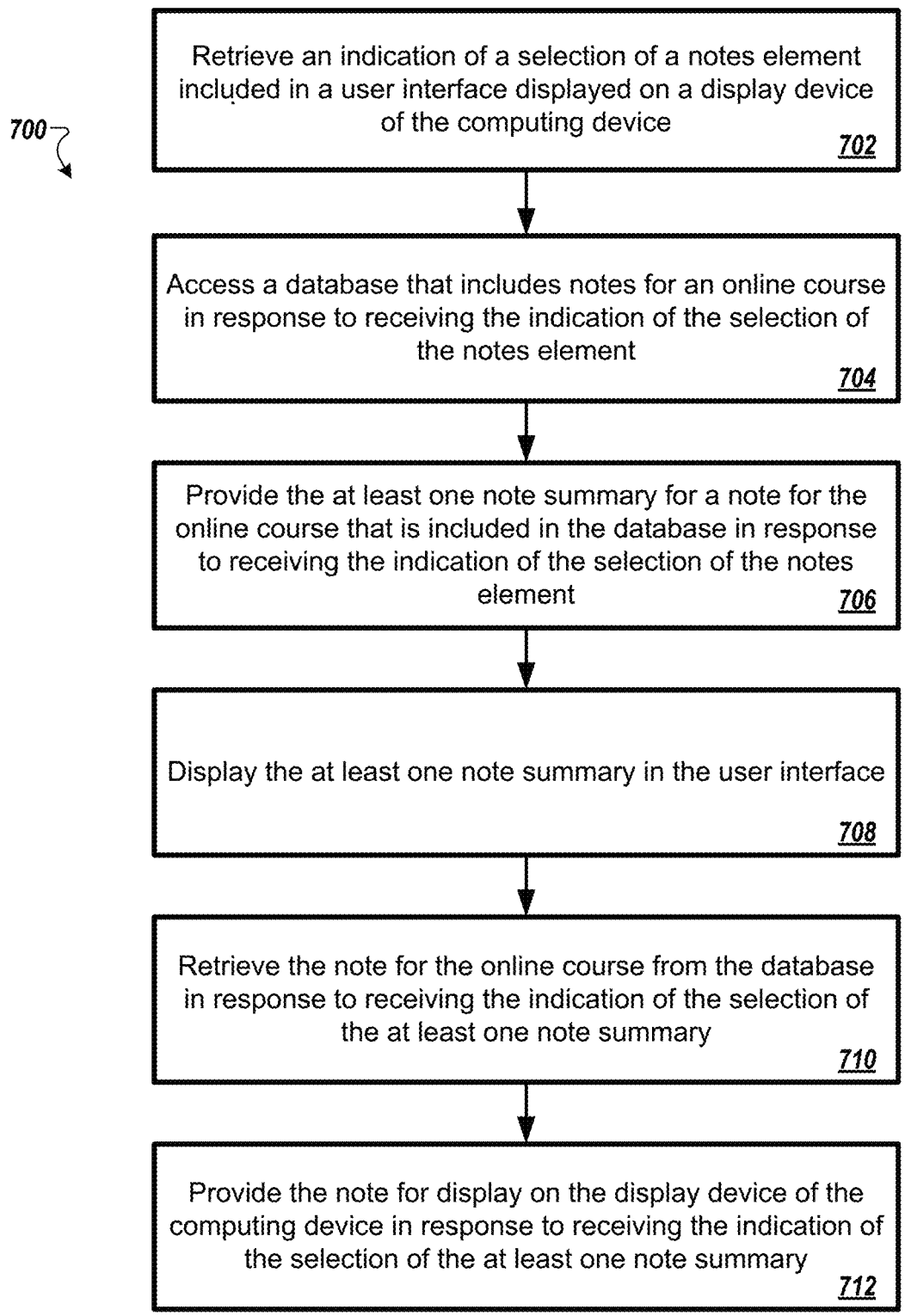
FIG. 7 is a flowchart that illustrates a method for reviewing notes for a video of an online course.

FIG. 7 is a flowchart that illustrates a method 700 for reviewing notes for a video of an online course. In some implementations, the systems described herein can implement the method 700. For example, the method 700 can be described referring to FIGS. 1, 2A-C, 3A-E, 4A-D and 5.

An indication of a selection of a notes element included in a user interface displayed on a display device of the computing device is received by a computer system and from a computing device (block 702). For example, referring to FIG. 4A, a learner can select (click on) the notes element 402.

In response to receiving the indication of the selection of the notes element, a database that includes notes for an online course is accessed by the computer system (block 704). The notes were previously created by a learner for the online course. For example, referring to FIG. 1, the note retrieving application 146 can access the database 142c (the notes repository) to identify notes for the learner that are associated with the online course.

In response to receiving the indication of the selection of the notes element, at least one note summary for a note for the online course that is included in the database is provided by the computer system and to the computing device (block 706). The at least one note summary can be for display in the user interface. For example, the note retrieving application 146 can provide a summary of a note for the online course where the note is stored in the database 142c (the notes repository).

An indication of a selection of the at least one note summary is received by the computer system and from the computing device (block 708). For example, referring to FIG. 4B, a learner can select (click on) elements included in the note summary (e.g., forward control icons, screen shot icons) in order to view the note in a user interface displayed on a display device (e.g., the display device 122) included in a computing device (e.g., the computing device 102c) of the learner.

In response to receiving the indication of the selection of the at least one note summary, the note for the online course is retrieved from the database by the computer system (block 710). For example, the computing device 102c by way of the network 116 can send the indication of the selection of one of the elements included in the note summary to the computer system 130. The note retrieving application 146 can access and retrieve the note from the database 142c (the notes repository).

In response to receiving the indication of the selection of the at least one note summary, the note is provided, by the computer system and to the computing device, for display on the display device of the computing device (block 712). The note can include an indicator of a frame in a video of an online course when a particular phrase included in a transcript of the video is spoken, the transcript of at least the particular phrase, and a screen shot of the frame. The note retrieving application 146 can provide the note to the computing device 102*c* by way of the network 116. The computing device 102*c* can display the note (e.g., the first note 442, the second note 462) n a user interface (e.g., the user interface 440, the user interface 460, respectively) displayed on the display device 122.

Figure 8:
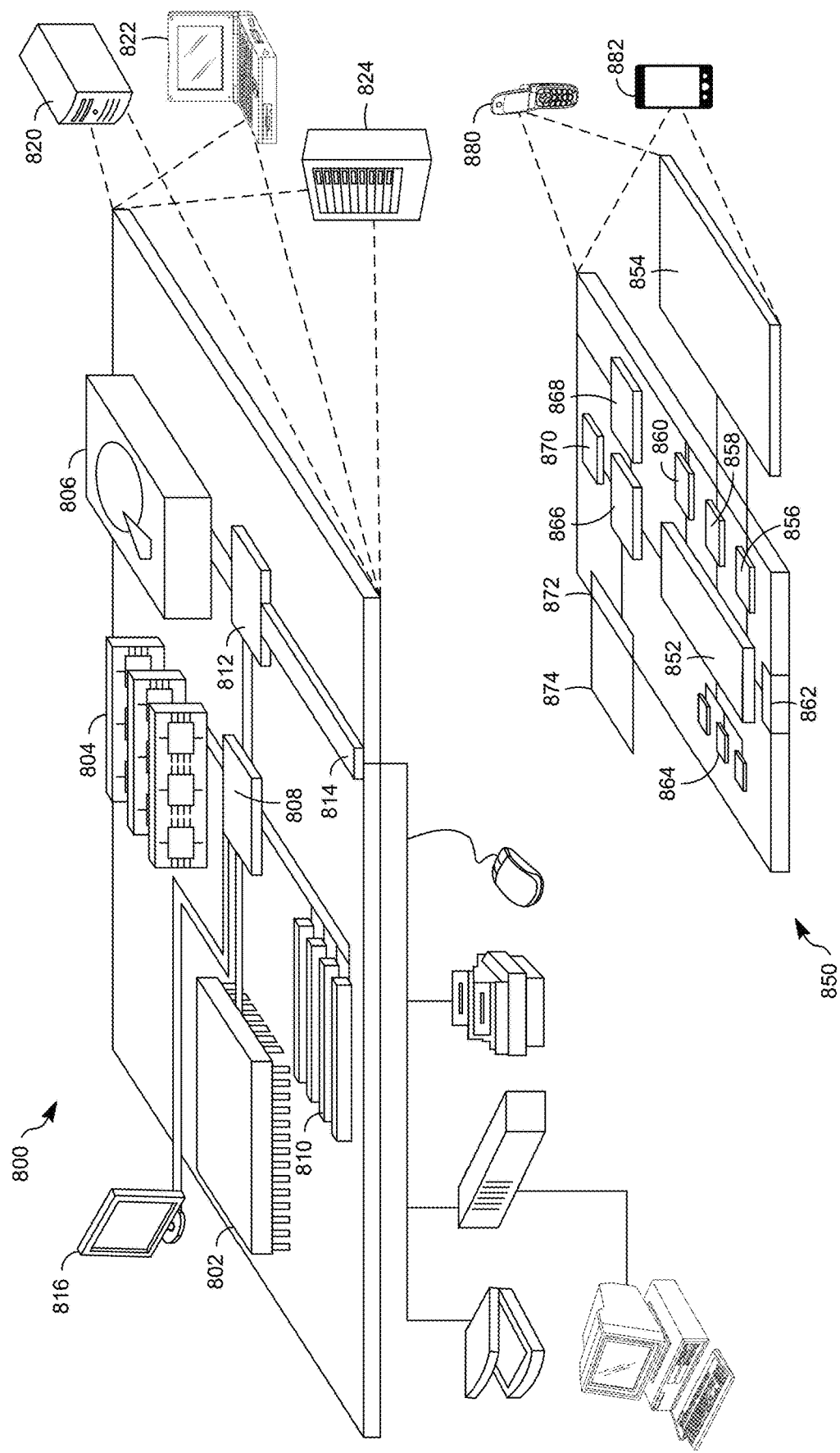
FIG. 8 shows an example of a computer device and a mobile computer device that can be used to implement the techniques described here.

FIG. 8 shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method for generating a note for a video of an online course, the method comprising:

providing, by a computer system and to a computing device, a video of an online course for display in a user interface on a display device included in the computing device;

providing, by the computer system and to the computing device, a transcript of the video of the online course synchronously with the providing of the video of the online course, the transcript being displayed in the user interface with the video of the online course;

receiving, by the computer system and from the computing device, an indication of a selection of a save-a-note element included in the user interface; and in response to receiving the indication of the save-a-note element, creating a note for the video of the online course, the note including:
   an indicator of a frame in the video when a particular phrase included in the transcript of the video is spoken;
   the particular phrase; and
   a screen shot of the frame.

2. The method of claim 1, wherein the transcript includes a plurality of phrases.

3. The method of claim 2, wherein the plurality of phrases include at least one phrase that was spoken before the particular phrase and at least one phrase that was spoken after the particular phrase.

4. The method of claim 1, wherein creating the note further includes receiving, by the computer system and from the computing device, a learner annotation for inclusion in the note.

5. The method of claim 1, wherein the method further includes storing, by the computer system, the note in a notes repository.

6. The method of claim 1, wherein the method further includes:
   determining an amount of text included in the transcript of the video for including in the note, the determining including:
      identifying the particular phrase in the transcript; and
      identifying at least one or more sentences that includes the particular phrase.

7. The method of claim 6, wherein determining the amount of text included in the transcript of the video for including in the note further includes:
   identifying additional phrases included in the at least one or more sentences.

8. The method of claim 7, wherein determining the amount of text included in the transcript of the video for including in the note further includes:
   identifying a concept that includes the particular phrase and the identified additional phrases; and
   wherein the note further includes the concept.

9. A method for reviewing notes for a video of an online course, the method comprising:
   receiving, by a computer system and from a computing device, an indication of a selection of a notes element included in a user interface displayed on a display device of the computing device;
   in response to receiving the indication of the selection of the notes element:
      accessing, by the computer system, a database that includes notes for an online course, the notes being previously created by a learner for the online course; and
      providing, by the computer system and to the computing device, at least one note summary for a note for the online course that is included in the database, the at least one note summary being for display in the user interface;
   receiving, by the computer system and from the computing device, an indication of a selection of the at least one note summary; and
   in response to receiving the indication of the selection of the at least one note summary:
      retrieving, by the computer system, the note for the online course from the database; and
      providing, by the computer system and to the computing device, the note for display on the display device of the computing device, the note including an indicator of a frame in a video of an online course when a particular phrase included in a transcript of the video is spoken, a transcript of at least the particular phrase, and a screen shot of the frame.

10. The method of claim 9, wherein the note further includes a learner annotation.

11. The method of claim 9, wherein the computing device is in a portrait mode of operation.

12. The method of claim 9, wherein the transcript of at least the particular phrase includes a concept that includes the particular phrase.

13. A computer system comprising:
   an online course repository including a plurality of videos and transcripts of online courses;
   a notes repository; and
   a server including a course application, a note creator application, and a note retrieving application,
      the course application configured to:
         retrieve a video of an online course from the plurality of videos of online courses included in the online course repository;
         retrieve a transcript of the video of the online course from the online course repository; and
         provide the video of the online course synchronously with the transcript of the video of the online course, the video and the transcript for display in a user interface on a display device included in a computing device;
      the note creator application configured to:
         create a note for the video for the online course, the note including an indicator of a frame in the video when a particular phrase included in the transcript of the video is spoken, the particular phrase, and a screen shot of the frame; and
         store the note in the notes repository; and
      the note retrieving application configured to:
         provide a note summary for the note stored in the notes repository;
         retrieve the note from the notes repository; and
         provide the note to a computing device for display in a user interface on a display device included in the computing device.

14. The computer system of claim 13, wherein creating the note further includes a learner annotation.

15. The computer system of claim 13, wherein creating the note further includes determining an amount of text included in the transcript of the video of the online course for including in the note, the determining including:
   identifying the particular phrase in the transcript;
   identifying a concept that includes the particular phrase; and
   wherein the note further includes the concept.

16. The computer system of claim 15, wherein identifying a concept that includes the particular phrase includes:
   identifying at least one sentence that includes the particular phrase;
   identifying additional phrases included in the at least one sentence; and
   identifying additional sentences for the concept, the additional sentences being adjacent to the at least one sentence in the transcript of the video.

17. The computer system of claim 16, wherein the concept includes the at least one sentence and the additional sentences.

18. The computer system of claim 13, wherein the transcript includes a plurality of phrases.

19. The computer system of claim 18, wherein the plurality of phrases include at least one phrase that was spoken before the particular phrase and at least one phrase that was spoken after the particular phrase.

20. The computer system of claim 19, wherein the plurality of phrases are included in at least one sentence, the at least one sentence included in the transcript of the video.

* * * * *